US012160873B2

(12) United States Patent
Lee et al.

(10) Patent No.: US 12,160,873 B2
(45) Date of Patent: Dec. 3, 2024

(54) MONITORING FOR TRANSMISSIONS ON A PHYSICAL DOWNLINK CONTROL CHANNEL (PDCCH) IN A WIRELESS NETWORK

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); Erdem Bala, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/543,768

(22) Filed: Dec. 18, 2023

(65) Prior Publication Data

US 2024/0129930 A1    Apr. 18, 2024

Related U.S. Application Data

(63) Continuation of application No. 16/088,200, filed as application No. PCT/US2017/024943 on Mar. 30, 2017, now abandoned.

(60) Provisional application No. 62/373,046, filed on Aug. 10, 2016, provisional application No. 62/334,886, filed on May 11, 2016, provisional application No. 62/315,404, filed on Mar. 30, 2016.

(51) Int. Cl.
*H04W 72/23*    (2023.01)
*H04L 1/1812*    (2023.01)
(Continued)

(52) U.S. Cl.
CPC ........... *H04W 72/23* (2023.01); *H04L 1/1812* (2013.01); *H04L 1/1861* (2013.01); *H04L 5/0053* (2013.01); *H04W 72/0446* (2013.01)

(58) Field of Classification Search
None
See application file for complete search history.

(56) References Cited

U.S. PATENT DOCUMENTS 10,425,930 B2    9/2019    Kim et al.
2008/0187218 A1    8/2008    Strom
(Continued)

FOREIGN PATENT DOCUMENTS

CN    101233542 A    7/2008
CN    102946640    2/2013
(Continued)

OTHER PUBLICATIONS

Ericsson, "Design of DL DCI for short TTI," 3GPP TSG RAN WG1 Meeting #84, R1-160931, Malta (Feb. 15-19, 2016).
(Continued)

*Primary Examiner* — Jamaal Henson
(74) *Attorney, Agent, or Firm* — VOLPE KOENIG

(57) ABSTRACT

Methods for receiving downlink control information (DCI) are provided herein. A method performed by a wireless transmit/receive unit (WTRU) may include receiving configuration information indicating a location of a monitoring indicator and identifying a first one or more search spaces and a second one or more search spaces. The method may include receiving a first physical downlink control channel (PDCCH) transmission including first DCI, the DCI including the monitoring indicator at the indicated location. The method may include monitoring, based on the monitoring indicator, either the first one or more search spaces or the second one or more search spaces and decoding a second PDCCH transmission detected in either the first one or more search spaces or the second one or more search spaces to receive second DCI.

10 Claims, 15 Drawing Sheets

(51) Int. Cl.
*H04L 1/1829* (2023.01)
*H04L 5/00* (2006.01)
*H04W 72/0446* (2023.01)

(56) References Cited

U.S. PATENT DOCUMENTS

| | | | |
|---|---|---|---|
| 2009/0088148 | A1 | 4/2009 | Chung et al. |
| 2010/0113004 | A1 | 5/2010 | Cave et al. |
| 2012/0155316 | A1 | 6/2012 | Li et al. |
| 2013/0044664 | A1* | 2/2013 | Nory ............... H04L 1/0045 370/336 |
| 2013/0088973 | A1 | 4/2013 | Yang et al. |
| 2013/0242947 | A1* | 9/2013 | Chen ............... H04L 1/0061 370/335 |
| 2013/0329656 | A1 | 12/2013 | Goransson et al. |
| 2014/0071954 | A1 | 3/2014 | Au et al. |
| 2014/0119456 | A1 | 5/2014 | Bivolarsky |
| 2014/0146768 | A1 | 5/2014 | Seo et al. |
| 2014/0177547 | A1* | 6/2014 | Guo ............... H04W 72/23 370/329 |
| 2014/0301330 | A1* | 10/2014 | Lee ............... H04W 74/0833 370/329 |
| 2014/0328260 | A1 | 11/2014 | Papasakellariou et al. |
| 2015/0333898 | A1 | 11/2015 | Ji et al. |
| 2016/0143008 | A1 | 5/2016 | Lee et al. |
| 2016/0143030 | A1 | 5/2016 | Lee et al. |
| 2016/0174247 | A1* | 6/2016 | Ruiz Delgado ....... H04W 28/18 370/329 |
| 2016/0234800 | A1 | 8/2016 | Jung et al. |
| 2017/0142712 | A1 | 5/2017 | Lee et al. |
| 2017/0188340 | A1 | 6/2017 | Andgart et al. |
| 2017/0230994 | A1 | 8/2017 | You et al. |
| 2017/0251465 | A1 | 8/2017 | Andersson et al. |
| 2017/0273071 | A1 | 9/2017 | Nogami et al. |
| 2017/0318564 | A1 | 11/2017 | Lee et al. |
| 2018/0098337 | A1 | 4/2018 | Lee et al. |
| 2018/0206266 | A1 | 7/2018 | Byun et al. |
| 2018/0212732 | A1 | 7/2018 | You et al. |
| 2018/0234998 | A1 | 8/2018 | You et al. |
| 2018/0359068 | A1 | 12/2018 | Kim et al. |
| 2018/0376497 | A1 | 12/2018 | You et al. |
| 2019/0045487 | A1 | 2/2019 | You et al. |
| 2019/0098611 | A1 | 3/2019 | Shimezawa et al. |
| 2019/0223204 | A1* | 7/2019 | Kim ............... H04L 5/0053 |
| 2021/0212057 | A1 | 7/2021 | Takano |

FOREIGN PATENT DOCUMENTS

| | | | |
|---|---|---|---|
| CN | 103368716 | | 10/2013 |
| CN | 104854621 | A | 8/2015 |
| CN | 103733707 | | 6/2017 |
| EP | 1111904 | A2 | 6/2001 |
| EP | 2 768 174 | | 8/2014 |
| EP | 3301926 | A1 | 4/2018 |
| KR | 20180071928 | A | 6/2018 |
| WO | WO-2013177964 | A1 * | 12/2013 ............ H04W 48/12 |
| WO | 2014/107056 | | 7/2014 |
| WO | 2016/040290 | | 3/2016 |
| WO | 2016/064049 | | 4/2016 |
| WO | 2017/078966 | | 5/2017 |
| WO | 2017/136592 | | 8/2017 |
| WO | 2017/170157 | | 10/2017 |
| WO | 2017/173177 | | 10/2017 |

OTHER PUBLICATIONS

Ericsson, "Physical layer aspects of short TTI for downlink transmissions," 3GPP TSG RAN WG1 Meeting #84, R1-160934, Malta (Feb. 15-19, 2016).

Ericsson, "Study of shorter TTI for latency reduction," 3GPP TSG-RAN WG2 #91bis, R2-154740, Malmö, Sweden (Oct. 5-9, 2015).

Huawei et al., "Short TTI for DL transmissions," 3GPP TSG RAN WG1 Meeting #84, R1-160292, St. Julian's, Malta (Feb. 15-19, 2016).

Interdigital Communications, "On sPDCCH Design," 3GPP TSG RAN WG1 Meeting #86, R1-167654, Gothenburg, Sweden (Aug. 22-26, 2016).

Interdigital Communications, "On sPDCCH Design," 3GPP TSG RAN WG1 Meeting #86bis, R1-1610096, Lisbon, Portugal (Oct. 10-14, 2016).

Interdigital Communications, "On sPDCCH Design," 3GPP TSG RAN WG1 Meeting #88, R1-1702304, Athens, Greece (Feb. 13-17, 2017).

Interdigital Communications, "On sPDCCH Design," R1-1706004, Spokane, USA (Apr. 3-7, 2017).

Interdigital, "Consideration on sPDCCH Design," 3GPP TSG RAN WG1 Meeting #85, R1-165049, Nanjing, China (May 23-27, 2016).

Interdigital, "Short-TTI PDCCH Design," 3GPP TSG RAN WG1 Meeting #84bis, R1-162963, Busan, Korea (Apr. 11-15, 2016).

Nokia Networks et al., "Considerations on required downlink physical layer enhancements for shorter TTI," 3GPP TSG RAN WG1 Meeting #84, R1-160786, St. Julian's, Malta (Feb. 15-19, 2016).

Samsung, "Specification impact for DL due to TTI shortening," 3GPP TSG RAN WG1 Meeting #84, R1-160585, St. Julian's, Malta (Feb. 15-19, 2016).

Samsung, "Specification impact for UL due to TTI shortening," 3GPP TSG RAN WG1 Meeting #84, R1-160586, St. Julian's, Malta (Feb. 15-19, 2016).

Third Generation Partnership Project, "Technical Specification Group Radio Access Network; Evolved Universal Terrestrial Radio Access (E-UTRA); Physical channels and modulation (Release 13)," 3GPP TS 36.211 V13.1.0 (Mar. 2016).

Third Generation Partnership Project, "Technical Specification Group Radio Access Network; Evolved Universal Terrestrial Radio Access (E-UTRA); Physical channels and modulation (Release 13)," 3GPP TS 36.211 V13.5.0 (Mar. 2017).

Third Generation Partnership Project, "Technical Specification Group Radio Access Network; Evolved Universal Terrestrial Radio Access (E-UTRA); Physical channels and modulation (Release 14)," 3GPP TS 36.211 V14.2.0 (Mar. 2017).

Third Generation Partnership Project, "Technical Specification Group Radio Access Network; Evolved Universal Terrestrial Radio Access (E-UTRA); Physical layer procedures(Release 13)," 3GPP TS 36.213 V13.1.0 (Mar. 2016).

Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).

Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.5.0 (Mar. 2017).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.2.0 (Mar. 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0 (Dec. 2015).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.7.0 (Mar. 2017).

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.1.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.5.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
ZTE et al., "sPDCCH design for short TTI," 3GPP TSG RAN WG1 Meeting #88bis, R1-1704640, Spokane, USA (Apr. 3-7, 2017).
ZTE, "Downlink control channels for short TTI," 3GPP TSG RAN WG1 Meeting #84, R1-160983, St Julian's, Malta (Feb. 15-19, 2016).

* cited by examiner

MONITORING FOR TRANSMISSIONS ON A PHYSICAL DOWNLINK CONTROL CHANNEL (PDCCH) IN A WIRELESS NETWORK

CROSS REFERENCE TO RELATED APPLICATIONS

This application is a continuation of U.S. patent application Ser. No. 16/088,200 filed Sep. 25, 2018, which is abandoned, which is the U.S. National Stage, under 35 U.S.C. § 371, of International Application No. PCT/US2017/024943 filed Mar. 30, 2017, which claims the benefit of U.S. Provisional application No. 62/315,404 Filed on Mar. 30, 2016, U.S. Provisional Application No. 62/334,886 filed on May 11, 2016, and U.S. Provisional Application No. 62/373,046 filed on Aug. 10, 2016, the contents of all of which are hereby incorporated by reference herein.

BACKGROUND

With new applications emerging for cellular technology such as alarm reporting, automotive safety, and factory process control, the importance of low latency cellular communications, including machine type communications (MTC), has rapidly increased. For example, in an LTE Advanced (LTE-A) system, the typical 1 ms transmission time interval (TTI) and associated latencies may no longer be sufficient. Existing applications such as gaming and real-time applications like VoLTE and video telephony/conferencing, may also benefit from reduced latency in terms of, for example, increased perceived quality of experience.

SUMMARY

A method for a wireless transmit receive unit WTRU to receive control information for a short transmission time interval (sTTI) communications are disclosed. The method may include receiving a configuration for one or more sTTI resources, receiving an indication of the presence. of a configured sTTI resource, and monitoring a short PDCCH (sPDCCH) in the configured sTTI reserouce using with a number of blind decoding candidates. The number blind decoding candidates may be based on the length of the sTTI. The indication may be received on a physical hybrid-ARQ indicator channel (PHICH). The configuration of sTTI resources may be received in a sTTI indicator. The sTTI indicator may be basd on a set of PHICH resources.

BRIEF DESCRIPTION OF THE DRAWINGS

A more detailed understanding may be had from the following description, given by way of example in conjunction with the accompanying drawings wherein.

DETAILED DESCRIPTION

Figure 1A:
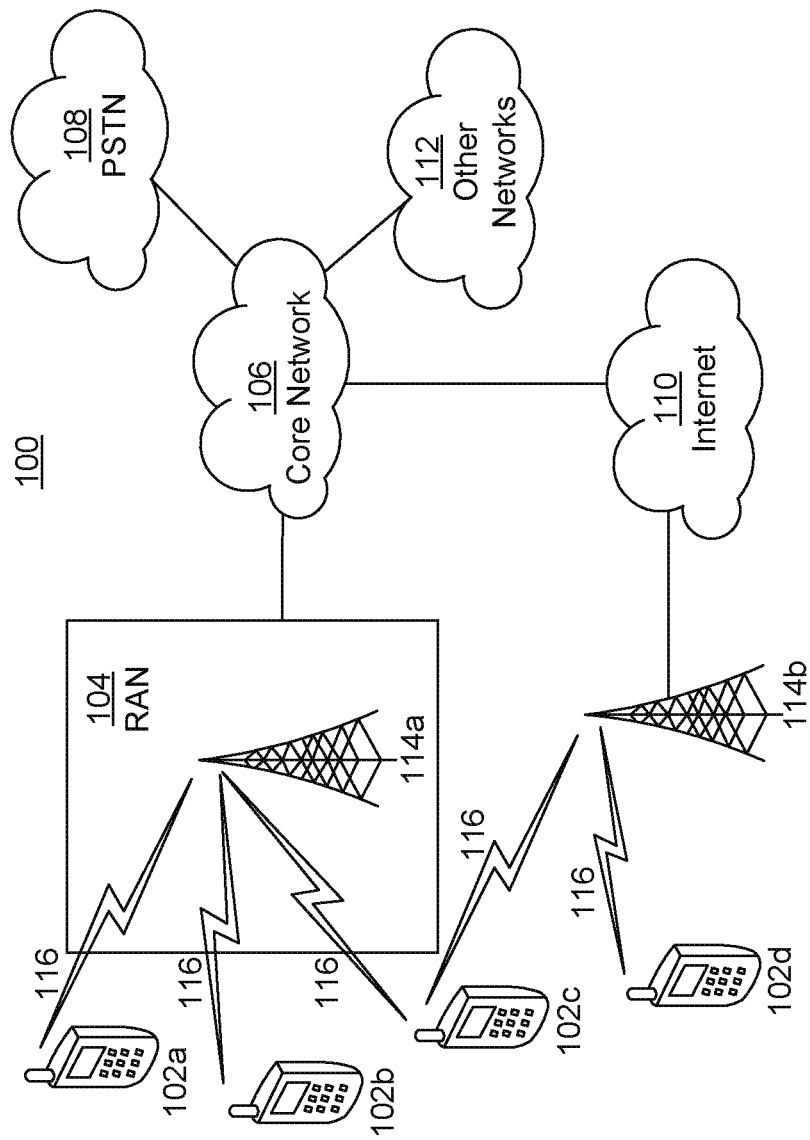
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, may be any type of device configured to operate and/or communicate in a wireless environment. By way of example, the WTRUs 102a, 102b, 102c, 102d, may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d, to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d, over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c, may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c, may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c, may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
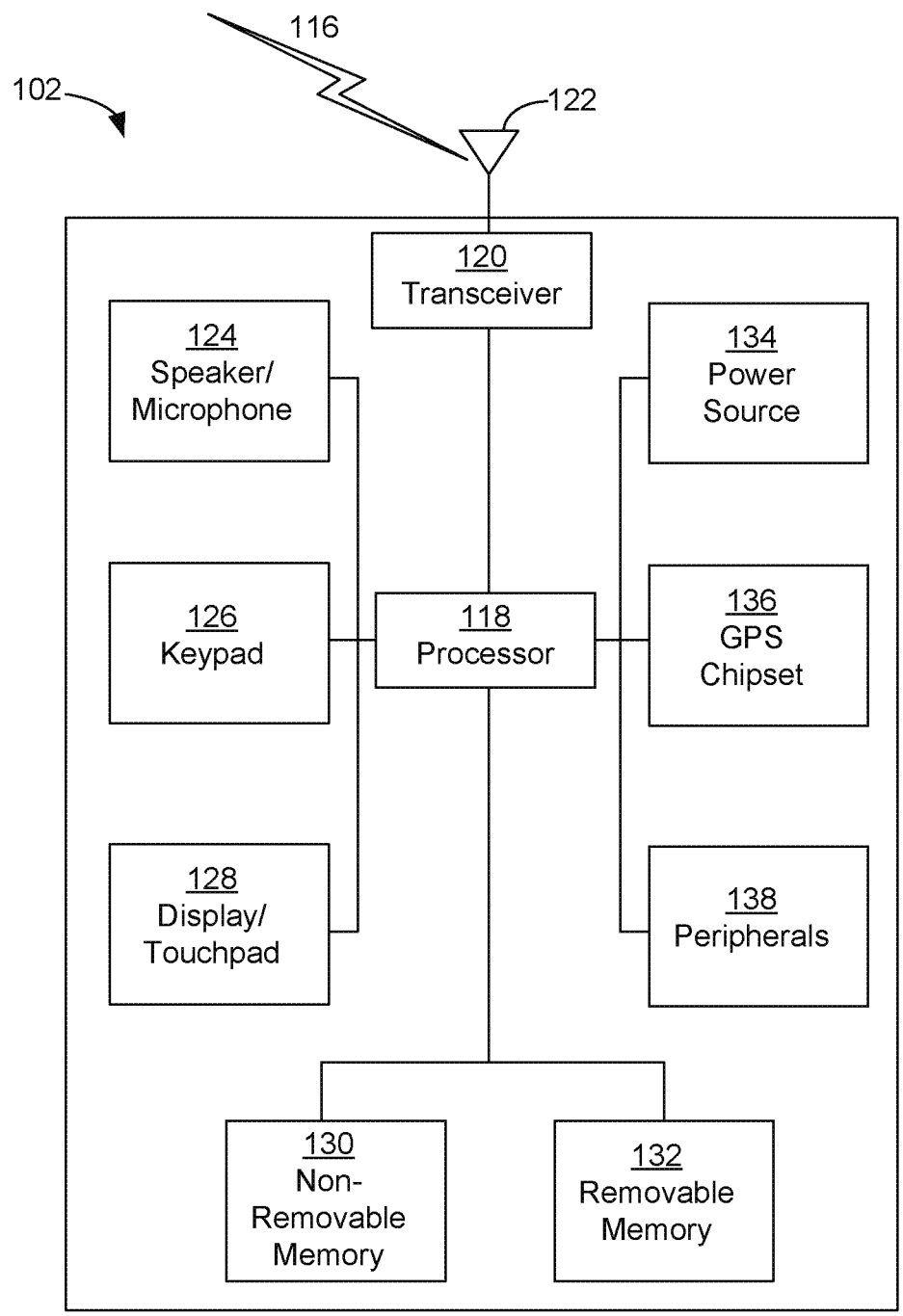
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
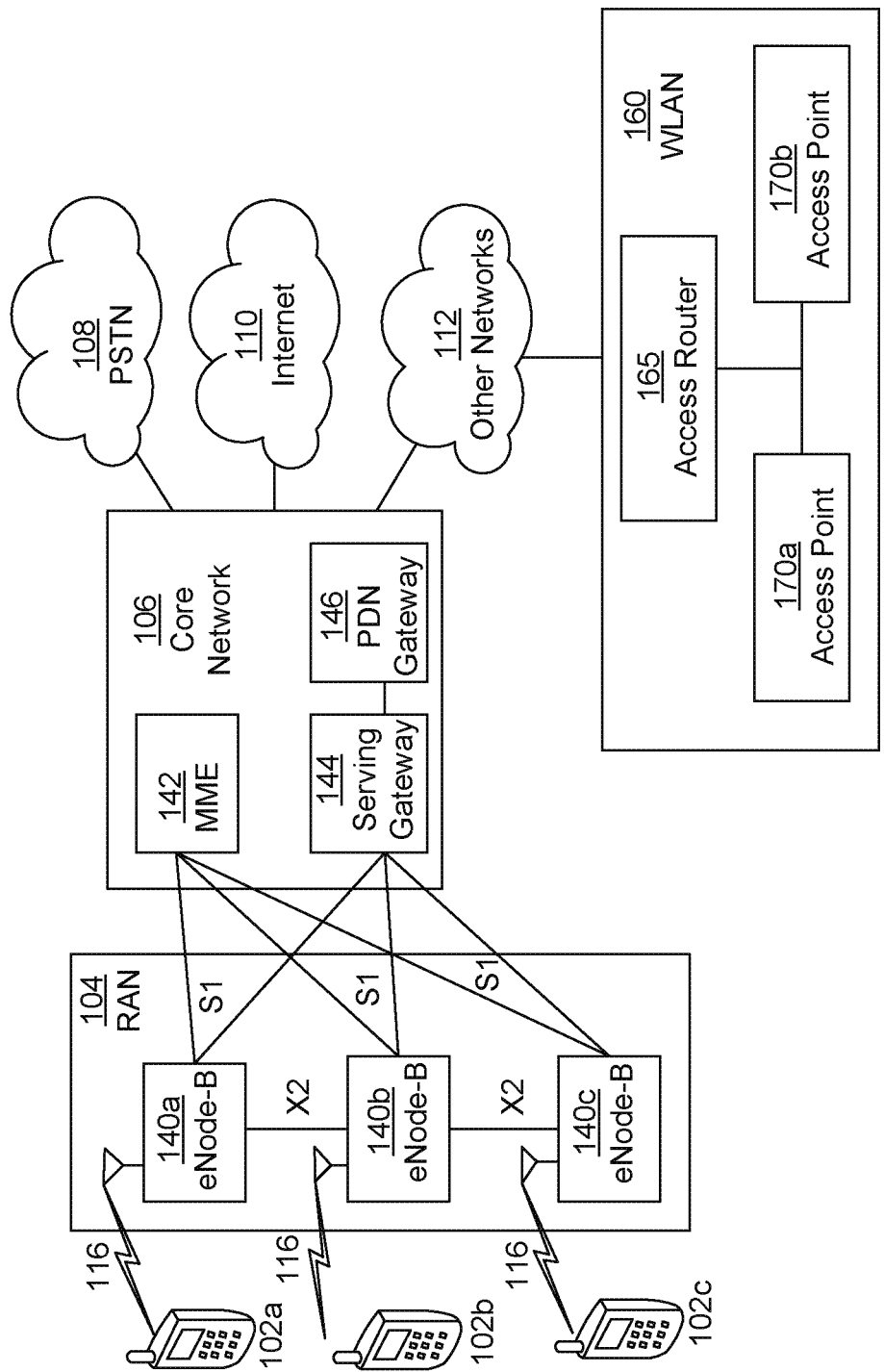
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c bearer activation/deactivation, selecting a particular serving gateway during an initial attach of the WTRUs 102a, 102b, 102c and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

A short transmission time interval (sTTI) may be used to reduce latency. Physical channels that have been designed based on one normal TTI (nTTI) length (e.g., 1 ms) may not be optimized for, or may not work properly for, a shorter TTI length (e.g., one or several symbols in duration). For example, shortening the TTI of a control channel (e.g., a downlink (DL) control channel) or reducing the number of symbols available for a control channel may impact the performance of the channel. A redesign of one or more channels may be needed to reduce the performance impact that may occur due to TTI shortening.

In addition, the rules for control channel monitoring have been designed for a level of blind decoding complexity and battery consumption for a particular TTI length. Shortening the TTI by a factor of N may result in an N-fold increase in the number of blind decodes if the same rules are used. Mechanisms may be needed to reduce the impact to blind decoding complexity and battery consumption that may occur due to TTI shortening.

The terms low latency transmission, reduced latency transmission, and sTTI transmission may be used interchangeably. A reduced latency transmission may use a reduced TTI or sTTI. The terms reduced TTI, short TTI, sTTI, and rTTI may be used interchangeably. The terms TTI and TTI length may be used interchangeably. A short TTI length may refer to a TTI length shorter than another TTI length that may be a typical, normal, nTTI, or regular TTI length such as 1 ms or 14 Orthogonal Frequency Division Multiplex (OFDM) symbols. A regular (e.g., normal or legacy) transmission may use a nTTI. The terms typical, normal, regular, and legacy may be used interchangeably. A short TTI length may be defined by a number, Ns, of OFDM symbols, where Ns may be smaller than the number of OFDM symbols for a nTTI (e.g., Ns<14).

A time, frequency, and/or spatial resource may be configured, predefined, allocated, or indicated as a resource for sTTI transmission and/or reception. It should be noted that a resource for sTTI transmission, sTTI resource, sTTI PRBs, sTTI subframes, sTTI symbols, sTTI REs, and sTTI antenna ports may be used interchangeably herein.

A time resource may include, but may not be limited to, one or more OFDM symbols, one or more SC-FDMA symbols, one or more time slots, one or more subframes, one or more radio frames, and/or one or more time samples. A frequency resource may include, but may not be limited to, one or more subcarriers, one or more PRBs, and/or one or more component carriers. A spatial resource may include, but may not be limited to, one or more antenna ports, one or more reference signals, one or more cells, one or more physical cell-IDs (PCID), and/or one or more virtual cell-IDs (VCID).

Figure 2:
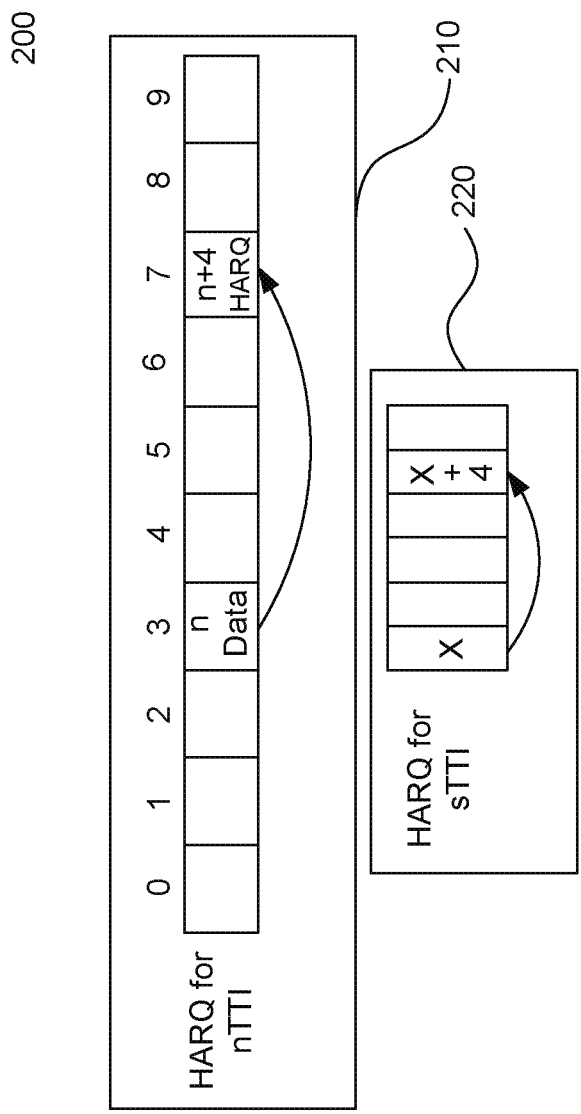
FIG. 2 is a diagram illustrating a conventional hybrid automatic repeat request (HARQ) and a HARQ for a shortened transmission time interval (sTTI)

FIG. 2 shows an example 200 of a conventional hybrid automatic repeat request (HARQ) for an nTT 210, and a HARQ for a shortened transmission time interval (sTTI) 220. In an embodiment the sTTI length may be between 1 symbol and 1 timeslot, which may be 7 symbols. As shown in FIG. 2, a sTTI may require less processing time and may provide for reduced hybrid automatic repeat request (HARQ) round trip time (RTT). The nTTI length of 1 ms may be too long to meet the needs of low latency communications, such as, for example, machine-type communications, alarm reporting, automotive safety, factory process control, gaming, and voice over LTE (VoLTE). The scope of reduced latency may include: Physical channel design with shortened TTI for PDCCH, PDSCH, PUSCH, and PUCCH; reference signal design for the shortened TTI physical channel demodulation; and HARQ operation with a sTTI.

One or more components may contribute to the total end to end delay for connected WTRUs. These components may include, for example, one or more of the following: scheduling grant acquisition time, TTI, processing time, and hybrid-RTT. The transmission of a request, grant, HARQ feedback, and/or data may be done according to the timing of blocks or chunks, for example subframes, which may have a fixed or known duration (e.g., 1 ms). The duration may be referred to as a TTI. Processing time may be, or may include, the time needed or used to process (e.g., encode and/or decode) data and/or control signaling or information. This may be done, for example, at or by the WTRU and/or the eNB. Data processing time may be proportional to the TTI and/or transport block (TB) size of the data.

Downlink (DL) control channels may be mapped to at least a portion of a subframe. For example, DL control channels may be located in (e.g., may be transmitted in) a set of OFDM symbols of a subframe, such as the first 1-3 or the first 2-4 OFDM symbols of a subframe. The range of OFDM symbols that may be used (e.g., 1-3 or 2-4) may be based on the system bandwidth. DL control channels may be located in one or more subframes. In an embodiment, the DL control channels may be located in every subframe.

Figure 3:
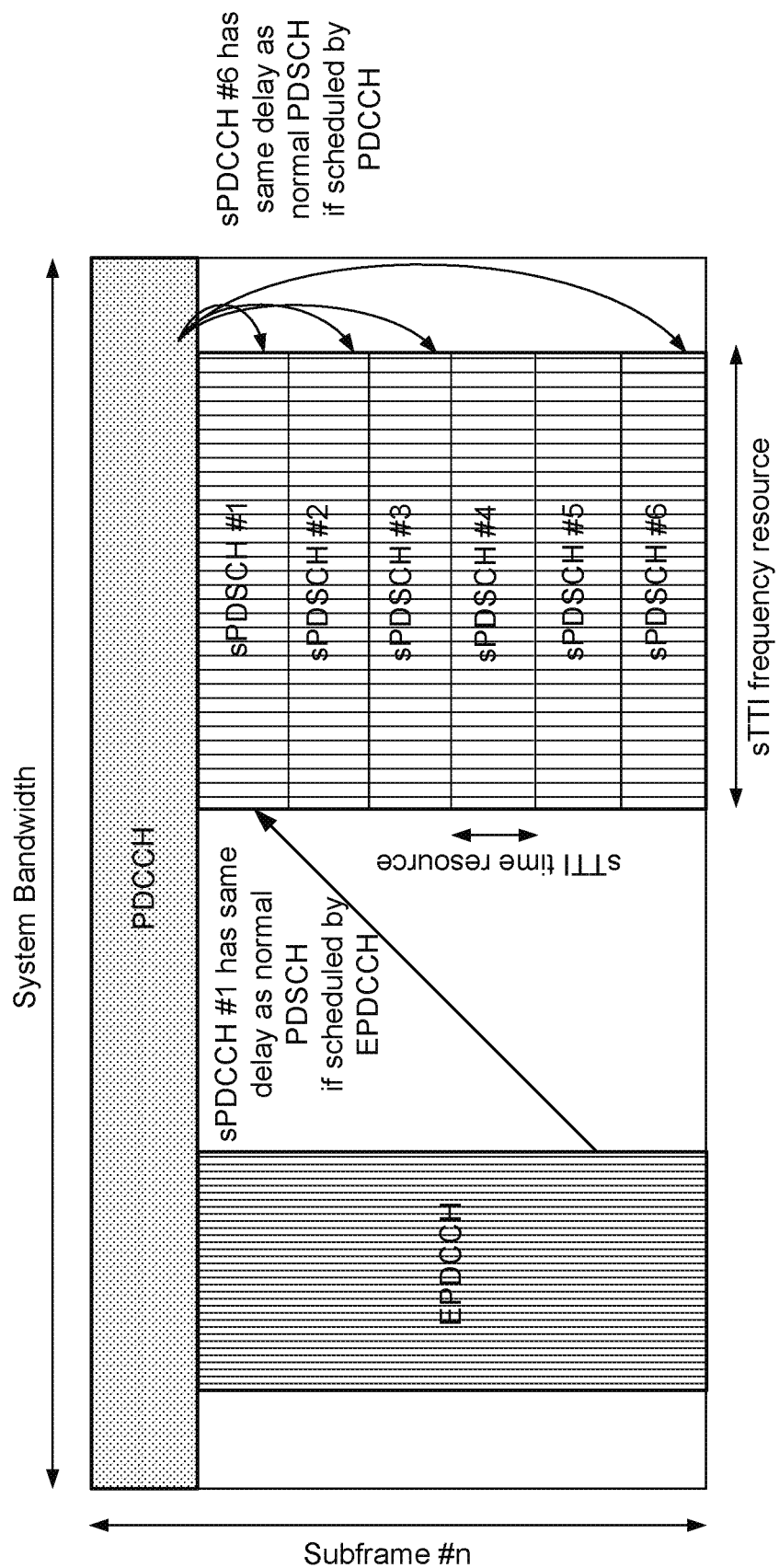
FIG. 3 is a diagram illustrating the use of legacy EPDCCH for sTTI resource scheduling.

A DL control channel for sTTI resources (e.g., sPDCCH) scheduling is needed. FIG. 3 is an example of using a legacy EPDCCH for sTTI resource scheduling. In FIG. 3, a subframe includes a PDCCH region at the beginning of the sub frame. The subframe also includes an EPDCCH region occurring in symbols after the PDCCH across a portion of the bandwidth. The subframe also includes 6 sPDSCH regions occurring across a portion of the bandwidth allocated for sTTI frequency resources. Each sPDSCH region has duration of one sTTI.

As shown in FIG. 3, the use of legacy PDCCH for sTTI resource scheduling may increase latency depending on sTTI resource location in a subframe. Also, the use of legacy EPDCCH for sTTI resource scheduling may not reduce the latency since a WTRU may need to wait until the end of a subframe to decode the EPDCCH. If a sPDSCH is located in each sTTI resource, complexity of blind decoding within a time window (e.g., 1 ms) may increase due to the additional sPDSCH blind decoding operations on top of the legacy EPDCCH.

The number of symbols (e.g., 1-3 or 2-4) that may be used for DL control channels in a subframe may be determined according to the overhead of the control channels. The overhead of the control channels may be the amount of control information to be, or being transmitted, for example in the subframe. The number of symbols that may be used may be different in different subframes. For example, according to downlink control channel overhead, dynamic resource allocation may enable efficient downlink resource utilization, which may result in higher system throughput. The DL control channels that may be transmitted in a subframe may include one or more of a Physical Control Format Indicator Channel (PCFICH), a Physical Hybrid-ARQ Indicator Channel (PHICH), and a Physical Downlink Control Channel (PDCCH).

A DL control channel resource unit may be defined as one or more resource elements (REs) that may be contiguous in the frequency domain. In an embodiment, the DL control channel resource unit may contain 4 REs. A DL control channel resource element may be called a REG (Resource Elements Group).

Figure 4:
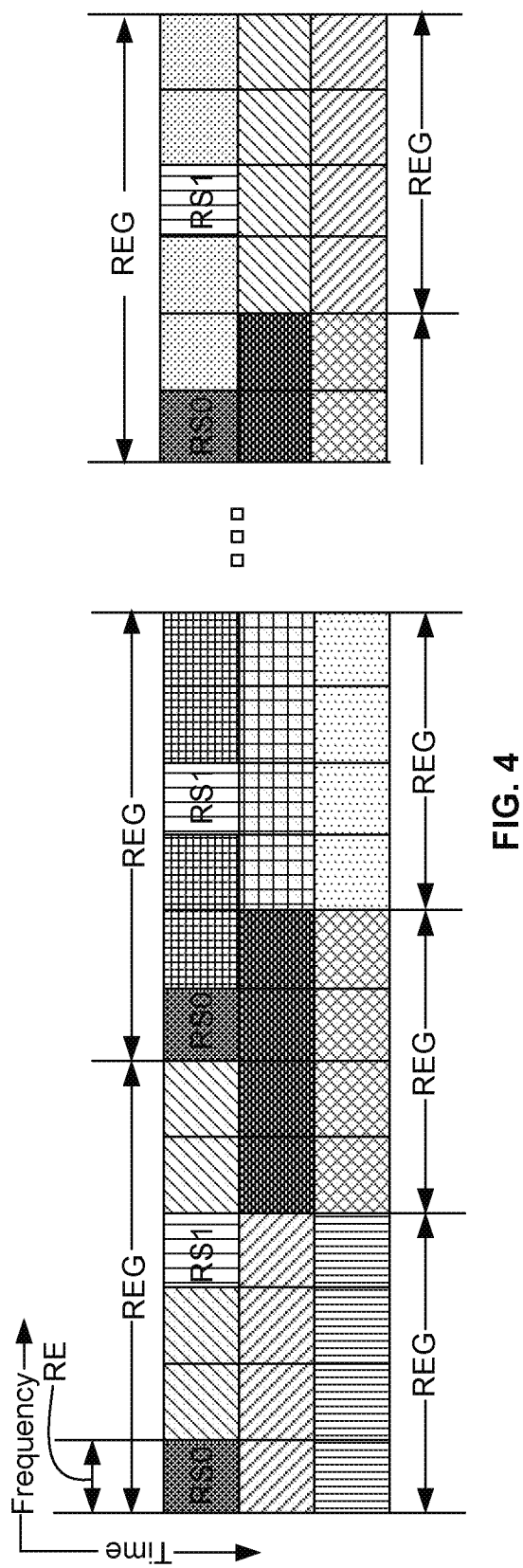
FIGS. 4 and 5 are examples of Resource Element Groups (REGs)
Figure 5:
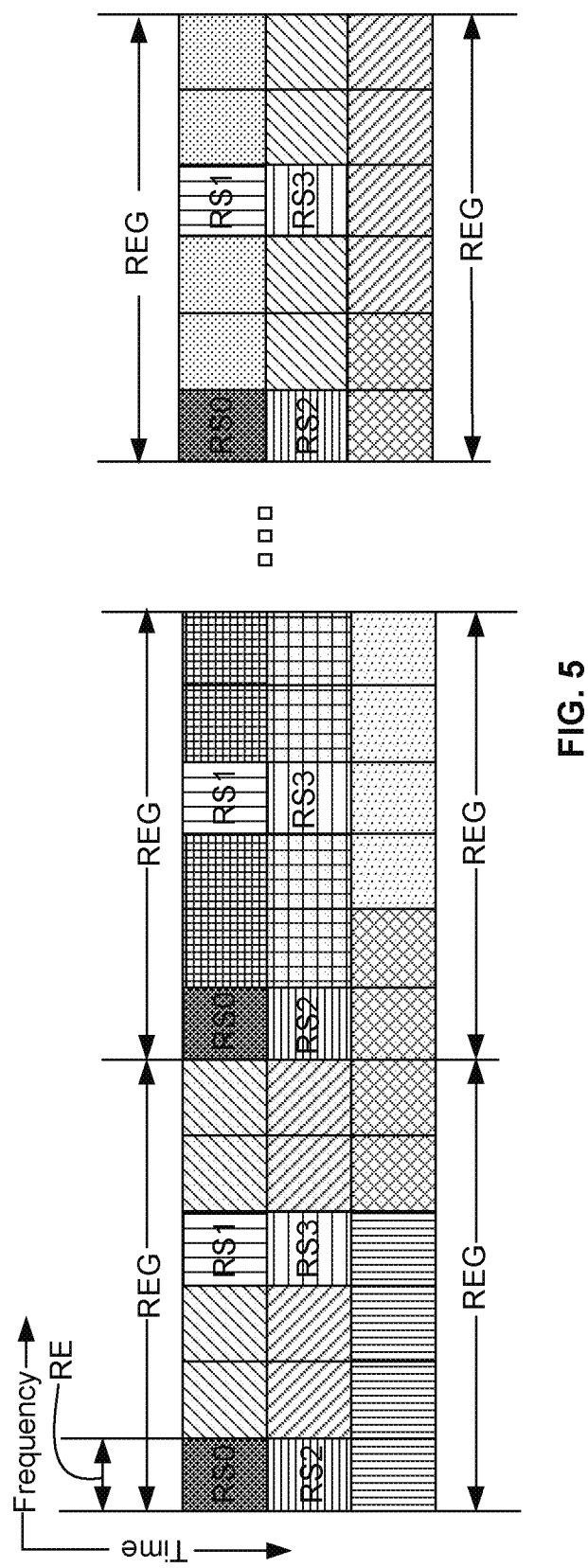

Referring now to FIGS. 4 and 5, examples of REGs are shown. FIGS. 4 and 5 show example definitions of REGs according to the number of cell specific reference signals (CRS), which may be CRS ports. FIG. 4 illustrates a REG definition in a downlink control channel region with 2 Tx cell specific reference signals (CRS) shown as RS0 and RS1. FIG. 5 illustrates a REG definition in downlink control channel region with 4 Tx CRS shown as RS0, RS1, RS2, and RS3. If a CRS is located in the same OFDM symbol as a DL control channel, a DL control channel REG may be comprised of REs (e.g., 4 REs) that are contiguous with the exception of REs containing CRS, which may be skipped over. In the examples, 3 symbols are used for the DL control channels, however, other configurations are possible. The set of symbols that may be used for DL control channels, for example in a subframe, may be referred to herein as a DL control channel region.

A PCFICH may be transmitted in an OFDM symbol (e.g., the first OFDM symbol or symbol 0) in one or more subframes, which may include every subframe. The PCFICH may indicate the number of OFDM symbols that may be used for downlink control channels in the subframe. The subframe-level dynamic downlink control channel resource allocation may be performed using the PCFICH. A WTRU may detect a Control Format Indicator (CFI) from a PCFICH. The downlink control channel region (e.g., the size of the DL control channel region) may be defined in a subframe according the CFI value. Table 1 shows an example of CFI codewords that may be detected from the PCFICH. Table 2 shows examples of downlink control channel resource allocation according to one or more parameters such as CFI value, subframe type, frame structure, and system bandwidth. System bandwidth in the DL may be represented by the number of resource blocks in the DL, $N_{RB}^{DL}$.

TABLE 1

Example CFI codewords

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

TABLE 2

Example Number of OFDM symbols used for PDCCH according to various parameters

| Subframe | Number of OFDM symbols for PDCCH when $N_{RB}^{DL} > 10$ | Number of OFDM symbols for PDCCH when $N_{RB}^{DL} \le 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| Other cases (e.g., all other cases) | 1, 2, 3 | 2, 3, 4 |

A PCFICH may not be transmitted and/or used in some subframes, for example in a subframe that does not support PDSCH or in a subframe in which PDSCH or another DL channel begins in a known symbol or time location. A WTRU may not try to detect the PCFICH in a subframe in which PCFICH may not be transmitted and/or used.

A number of REGs (e.g., 4 REGs) may be used for PCFICH transmission, for example in the first OFDM symbol in a subframe. The REGs may be uniformly distributed, in at least part of the system bandwidth (e.g., the DL system bandwidth) or throughout the whole system bandwidth. The distribution may exploit frequency diversity gain.

Figure 6:
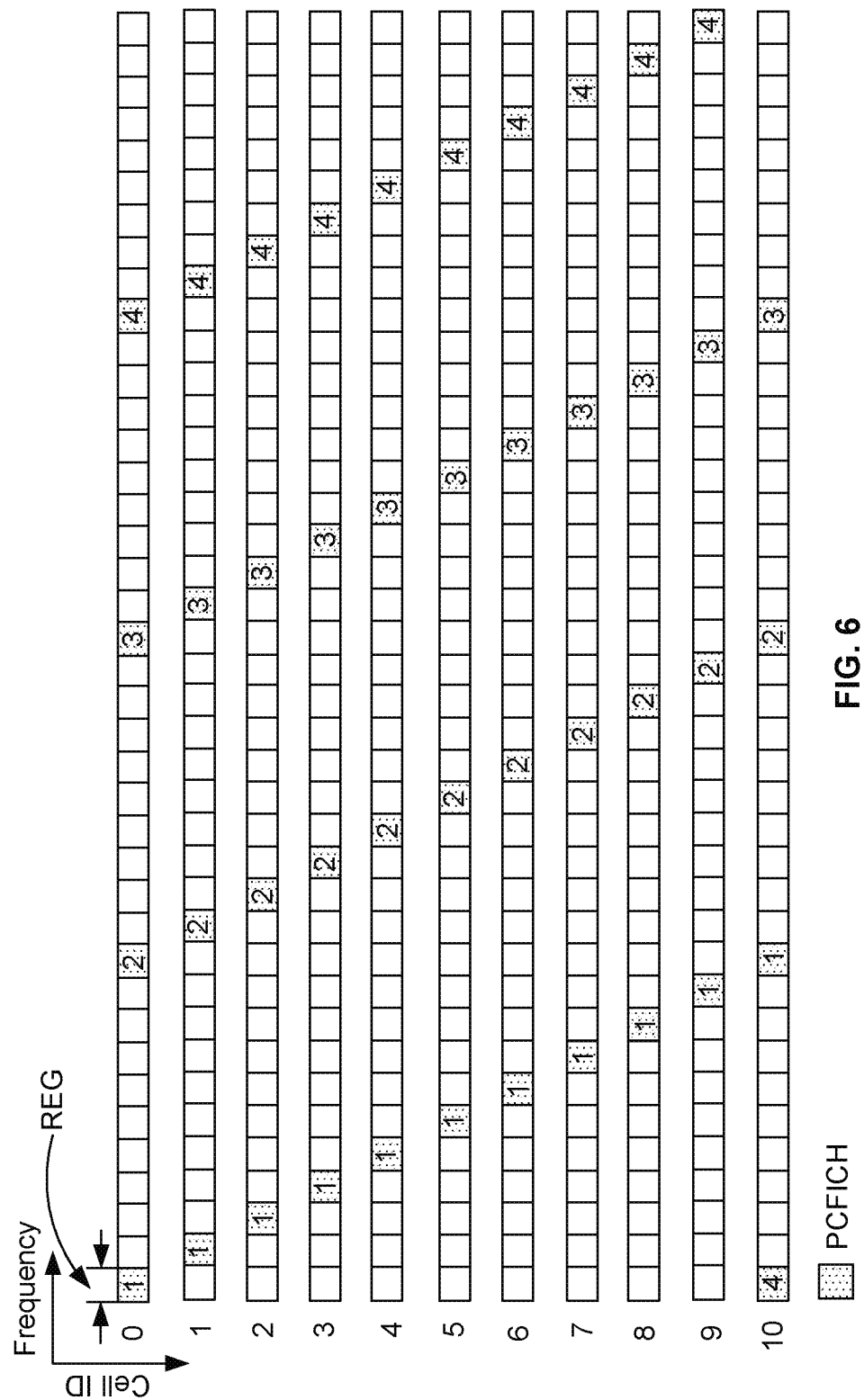
FIG. 6 is a diagram illustrating allocation of the Physical Control Format Indicator Channel (PCFICH) REGs according to a physical cell-ID (PCI)

Referring now to FIG. 6, a diagram illustrating allocation of the PCFICH REGs according to a physical cell-ID (PCI). The starting point of a PCFICH transmission (e.g., in frequency) may be different according to the PCI. A frequency shift of PCFICH based on a cell-ID may improve PCFICH detection performance, for example by avoiding PCFICH collision among multiple neighbor cells.

A WTRU may begin downlink control channel detection in a subframe by decoding PCFICH to determine the number of OFDM symbols for downlink control channels in the subframe. PCFICH detection error may result in the loss of at least one of a downlink grant, an uplink grant, and PHICH reception, for example since downlink control resources may be defined by PCFICH.

A PHICH may be used to transmit ACK or NACK corresponding to a PUSCH transmitted in an uplink subframe. A PHICH may be transmitted in a distributed manner, for example across at least part of the system bandwidth (e.g., the DL system bandwidth) and at least some of the OFDM symbols within the downlink control channel region. The number of OFDM symbols that may be used for PHICH may be referred to as a PHICH duration. The PHICH duration may be configurable, for example, by higher layer signaling or broadcast signaling (e.g., in a MIB or SIB). The PHICH resource position (e.g., in frequency) may vary according to PCI and/or PHICH duration.

Figure 7:
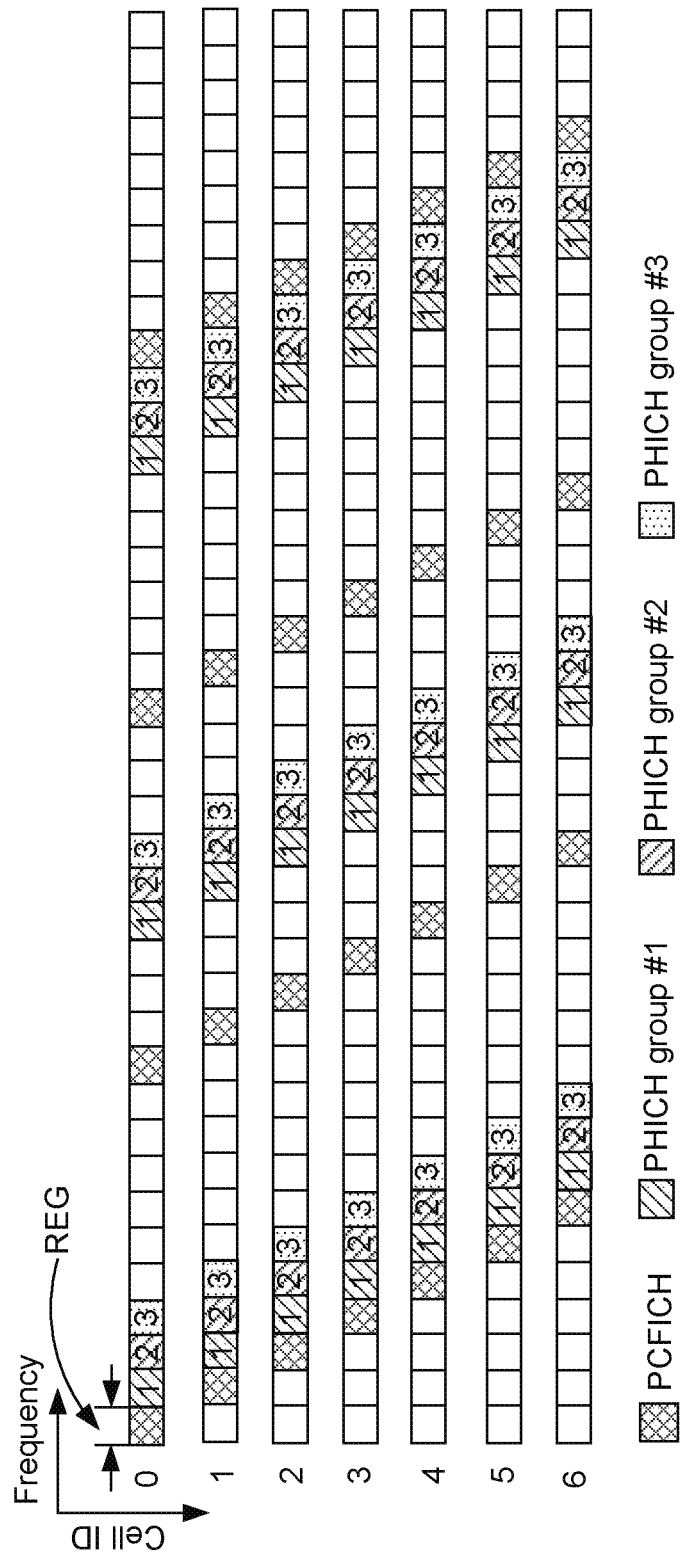
FIG. 7 is a diagram illustrating PCFICH and Physical Hybrid-ARQ Indicator Channel (PHICH) REGs according to PCI.

Referring now to FIG. 7, a diagram illustrating PCFICH and PHICH REGs according to PCI is shown. Multiple PHICH groups may defined or used in a cell. A PHICH group may contain multiple PHICHs that may have or use orthogonal sequences. The PHICH that may be intended for a WTRU may be defined dynamically, for example, with resource information provided in an uplink grant. The uplink grant may be for the PUSCH, for which the PHICH may include an ACK or NACK. The resource information may include a lowest PRB index ($I_{PRB\_RA}^{lowest\_index}$) and/or DM-RS cyclic shift ($n_{DMRS}$). A two index pair (e.g., PHICH group index: $n_{PHICH}^{group}$, PHICH sequence index: $n_{PHICH}^{seq}$) may indicate the PHICH resource for a specific WTRU. In an example PHICH index pair ($n_{PHICH}^{group}$, $n_{PHICH}^{seq}$), each index may be defined as follows:

$$n_{PHICH}^{group} = (I_{PRB\_RA}^{lowest\_index} + n_{DMRS}) \bmod N_{PHICH}^{group} \quad \text{Equation (1)}$$

$$n_{PHICH}^{seq} = (\lfloor I_{PRB\_RA}^{lowest\_idex}/N_{PHICH}^{group} \rfloor + n_{DMRS}) \bmod 2N_{SF}^{PHICH}, \quad \text{Equation (2)}$$

where the $N_{PHICH}^{group}$ may indicate the number of PHICH groups available in the system. The $N_{PHICH}^{group}$ may be defined as follows:

$$N_{PHICH}^{group} = \begin{cases} \lceil N_g(N_{RB}^{DL}/8) \rceil \\ 2 \cdot \lceil N_g(N_{RB}^{DL}/8) \rceil \end{cases} \quad \text{Equation (3)}$$

where $N_g$ may be information (e.g., 2 bit information) that may be transmitted via PBCH (Physical Broadcasting Channel) and the information may be within $N_g \in \{1/6, 1/2, 1, 2\}$.

The orthogonal sequence may be determined according to the spreading factor. An example is shown in Table 3.

TABLE 3

Example orthogonal sequence according to sequence index and spreading factor

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |

TABLE 3-continued

Example orthogonal sequence according to sequence index and spreading factor

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 7 | [+j −j −j +j] | — |

The HARQ indicator (HI) may be coded, for example as shown in Table 4. For a positive acknowledgement, HI may equal 1 and for a negative acknowledgement HI may equal 0.

TABLE 4

Example HI code words

| HI | HI code word <$b_0$, $b_1$, $b_2$> |
|---|---|
| 0 | <0, 0, 0> |
| 1 | <1, 1, 1> |

A PDCCH (or a PDCCH candidate) may be comprised of one or more Control Channel Element (CCE) resources that may be consecutive. One CCE may contain a number of REGs such as 9 REGs. The number of available CCEs ($N_{CCE}$) may be defined, for the example of 9 REGs per CCE, as $N_{CCE} = \lfloor N_{REG}/9 \rfloor$ where $N_{REG}$ may be the number of REGs not assigned to PCFICH or PHICH. Table 5 shows examples of PDCCH formats according to the number of CCEs where the CCEs may be consecutive.

TABLE 5

Example PDCCH formats

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A WTRU may monitor or may need to monitor one or more PDCCH candidates, for example to decode or successfully decode a PDCCH format, such as a DL Control information (DCI) format, that may be intended for the WTRU. A WTRU may decode (e.g., blindly decode) or attempt to decode one or more candidates at each of one or more aggregation levels. The set of PDCCH candidates a WTRU may monitor, may decode (e.g., blindly), may attempt to decode, may need to monitor, may need to decode (e.g., blindly), or may need to attempt to decode may be a search space. Table 6 shows examples of search spaces and associated PDCCH candidates.

TABLE 6

Example search spaces and associated PDCCH
candidates that may be monitored by a WTRU

| Type | Search space $S_k^{(L)}$ Aggregation level L | Size [in CCEs] | Number of PDCCH candidates $M^{(L)}$ |
|---|---|---|---|
| WTRU-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The number of CCEs may be different for different PDCCH formats, for example as shown in Table 5. An aggregation level may correspond to a number of CCEs, for example in a PDCCH format. A set of aggregation levels (e.g., {1, 2, 4, 8}) may be supported or used in a WTRU-specific search space. Another set of aggregation levels (e.g., {4, 8}) may be supported or used in a common search space. A WTRU-specific search space may be a search space configured for a WTRU that the WTRU may monitor. A common search space may be a search space that may be configured for the cell, for example in broadcast signaling, that one or more (e.g., all) WTRUs in the cell may monitor.

A search space $S_k^{(L)}$ at aggregation level L may be defined by a set of PDCCH candidates where, for example, L∈{1, 2,4,8} or L∈{4,8}. For a serving cell on which PDCCH is monitored, the CCEs corresponding to PDCCH candidate m of the search space $S_k^{(L)}$ may be given by:

$$L \cdot \{(Y_k + m') \bmod \lfloor N_{CCE,k}/L \rfloor \} + i \qquad \text{Equation (4)}$$

The term i may be defined as i=0, . . . ,L−1. The term m may be defined as m=0, . . . , $M^{(L)}$−1. The term $M^{(L)}$ may be the number of PDCCH candidates to monitor in the given search space. For a common search space, the term $Y_k$ may be set to 0, for example for the two aggregation levels L=4 and L=8.

For a WTRU-specific search space $S_k^{(L)}$ at aggregation level L, the variable $Y_k$ may be defined by:

$$Y_k = (A \cdot Y_{k-1}) \bmod D \qquad \text{Equation (5)}$$

where, for example, $Y_{-1} = n_{RNTI} \neq 0$, A=39827, D=65537, k=$\lfloor L_s/2 \rfloor$, and $n_s$ is the slot number within a radio frame.

The value of m' may be defined according to one or more of the search space type and configuration for use of cross carrier scheduling. Configuration for use of cross carrier scheduling may be indicated by configuration with carrier indicator field. When cross carrier scheduling is not used or configured for a serving cell, control channels (e.g., carrying grants or ACK/NACK) for the serving cell may be transmitted and/or monitored on, for example, the DL control channel region of that serving cell. When cross carrier scheduling is used or configured for a serving cell, control channels (e.g., carrying grants or ACK/NACK) for the serving cell may be transmitted and/or monitored on, for example, the DL control channel region of another serving cell.

For example, for the common search space, m' may be defined as m'=m . For a WTRU-specific search space, and for the serving cell on which PDCCH is monitored, m' may be defined as m'=m+$M^{(L)} \cdot_{CI}$. This may be applied when the monitoring WTRU is configured with a carrier indicator field, for example, for the serving cell to which the PDCCH candidates apply. The value of $n_{CI}$ may be the carrier indicator field value. For a WTRU-specific search space, and for the serving cell on which PDCCH is monitored, m' may be defined as a m'=m. This may be applicable when the monitoring WTRU is not configured with carrier indicator field, for example, for the serving cell to which the PDCCH candidates apply.

Resource element (RE) muting may be used in order to avoid collisions of signals. For a muted RE, puncturing or rate-matching may be used, for example, in a coding chain perspective. When puncturing is used, a signal which may be mapped to a punctured RE may not be transmitted or may be transmitted at zero power in that RE. When rate-matching is used, mapping of signals to REs may avoid mapping to certain REs, which may result in other signals not being transmitted.

In an example, a N-bit coded bit sequence for a channel, for example ($c_1$, . . . , $c_N$), may be an output of a channel encoder with a payload or information as an input. The channel encoder may be any channel code, including, for example, a turbo code, convolutional code, or Reed-Muller code. The coded bit sequence may be an input of a mapper.

A M-symbol modulated symbol sequence, for example ($x_1$, . . . , $x_M$), may be an output of a mapper where the coded bit sequence is modulated to a modulation scheme (e.g., BPSK, QPSK, 16 QAM, or 64 QAM). According to the modulation scheme used, the modulated symbol sequence length M may be equal to or smaller than N.

The modulated symbol sequence may be mapped to a set of REs for the channel according to a predefined order. For example, $x_1$, . . . , $x_M$ may be mapped onto M REs, which may be used for the channel in a predefined order. If the kth (where k≤M) RE is muted, for example due to a collision, puncturing may mean that modulated symbol $x_k$ is not be transmitted. Rate-matching may mean that the mapping skips REs that are muted and that fewer modulated symbols may be mapped. For one rate-matched RE, M−1 modulated symbols may be mapped and transmitted. For example, $x_1$, . . . , $x_{M-1}$ may be transmitted and one last modulated symbol may not be transmitted due to the muting of the $k^{th}$ RE. Puncturing may result in the loss of coded bits in the positions of the muted REs, while the rate-matching may result in the loss of coded bits from the last coded bits.

Hereinafter, RE muting with puncturing may be referred to as "RE puncturing" and RE muting with rate-matching may be referred to as "RE rate-matching." The term "RE muting" may include RE puncturing and/or RE rate-matching.

In conventional LTE systems, RE muting may be performed to avoid collisions between signals of different types in the same direction. For example, in the DL, PDSCH REs may be muted to avoid collisions with CSI-RS, and PRS REs may be muted to avoid collisions with PSS and SSS. In the UL, PUSCH and PUCCH may be shortened to avoid collision with SRS in the UL.

In an embodiment, one or more sTTI resource types may be used. A sTTI resource type may be associated with, and/or may be determined based on one or more parameters. One parameter may be a frequency location including at least one of PRB location, component carrier location, frequency band, and subcarrier location. Another parameter may be a frequency resource amount used including at least one of a number of PRBs, a number of subcarriers, a number of REs, and a number of component carriers. Another parameter may be a time location including at least one of a DL or UL symbol location within a subframe, a starting DL or UL symbol location within a subframe, a subframe number or a starting subframe number, and a SFN number.

Another parameter may be a time resource amount including at least one of a number of DL symbols (e.g., OFDMA symbols) or UL symbols (e.g., SC-FDMA symbols), a number of subframes, a number of slots, a number of time samples, and a number of radio frames. The time resource amount may be a function of or determined based on the number of sTTIs available in a subframe. Another parameter may be a spatial resource including at least one of an associated antenna port number or numbers, reference signal type (e.g., DM-RS or CRS), associated physical cell-ID, and associated virtual cell-ID.

One or more sTTI resource types may be used, configured, allocated, and/or indicated for a time period. The time period may be one or more, symbols, subframes, radio frames, or slots. The time period may be referred to herein as a sTTI time window. The terms sTTI time period, sTTI window, sTTI resource type time window, and sTTI time window may be used interchangeably. A sTTI window may be one or more of: the time period of a sTTI, the time period of a regular TTI, and/or a subframe.

A sTTI resource type may refer to resources for a sTTI physical downlink control channel (sPDCCH), a sTTI physical downlink shared data channel (sPDSCH), a sTTI physical uplink shared data channel (sPUSCH), and/or a sTTI physical uplink control channel (sPUCCH). The terms sTTI resource type and sTTI type may be used interchangeably. A channel or signal described herein may be respresented by an abbreviation that begins with s such as sPDCCH, sPDSCH, sPUSCH and sPUCCH. In the examples and embodiments described herein, the beginning s may be used to represent short or sTTI.

Figure 8:
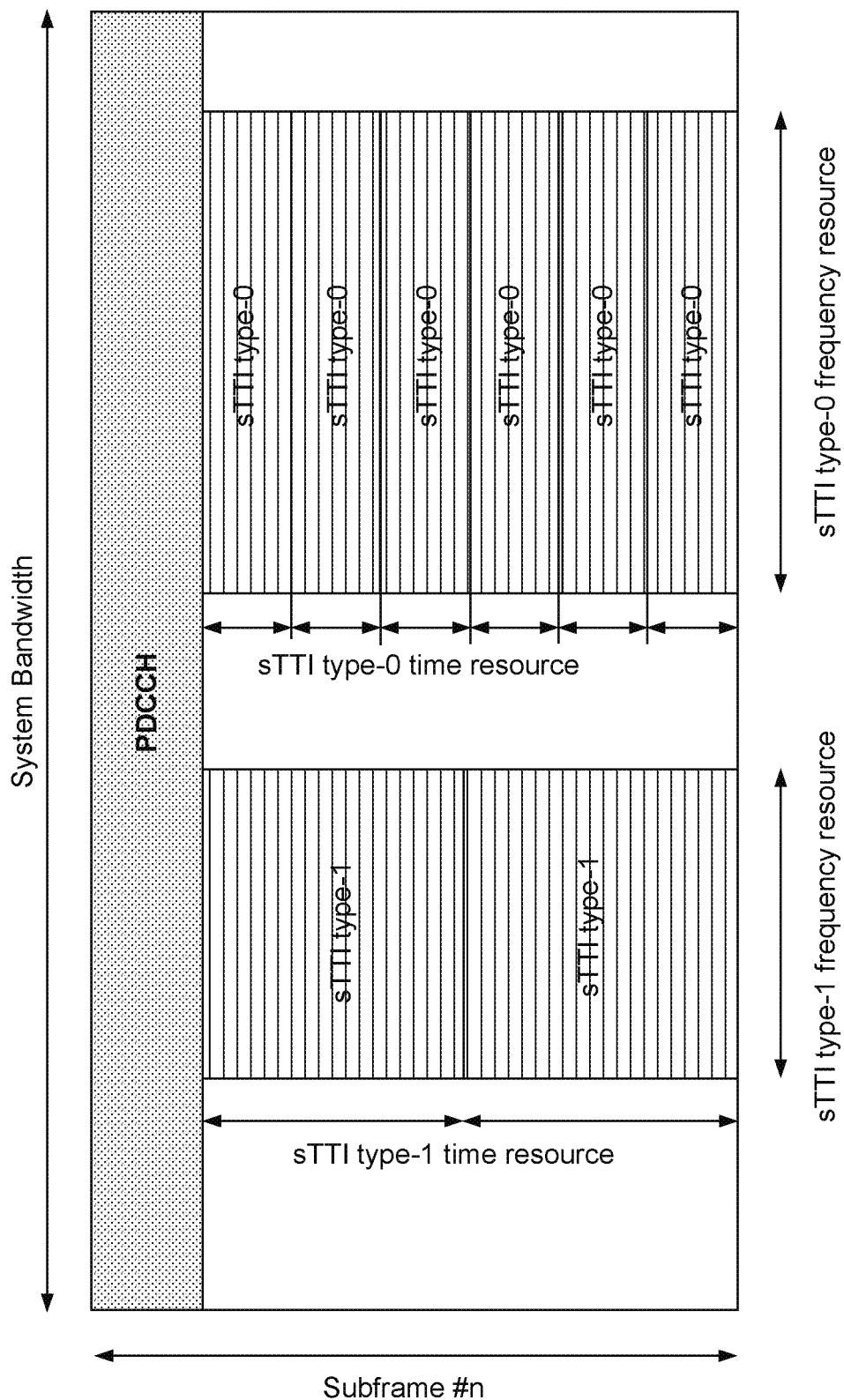
FIG. 8 is a diagram illustrating multiple sTTI resource types configured in a subframe.

FIG. 8 is a diagram illustrating multiple sTTI resource types configured in a subframe is shown. More specifically, FIG. 8 shows an example of a resource configuration with multiple sTTI resource types in a subframe, where a non-overlapped frequency may be used for different sTTI resource types. A first sTTI resource type and a second sTTI resource type may be located in non-overlapped sets of PRBs.

As described herein, a sTTI resource type may be determined, configured, or predefined for one or more sTTI physical channels (e.g., per sTTI physical channel). For example and a first sTTI resource type (e.g., sTTI type-0) may be used for sPDCCH and a second sTTI resource type (e.g., sTTI type-1) may be used for sPDSCH. In another example, a first sTTI resource type may be used for downlink physical channels and a second sTTI resource type may be used for uplink physical channels. In another example, a first sTTI resource type may be used for physical shared data channels (e.g., sPDSCH and/or sPUSCH) and a second sTTI resource type may be used for physical control channel (e.g., sPDCCH and/or sPUCCH).

In another example, a first sTTI resource type may be used for one or more sTTI physical channels using a first sTTI (e.g., sPDSCH using N symbols, where N may be 2) and a second sTTI resource type may be used for one or more sTTI physical channels using a second sTTI (e.g., sPDSCH using M symbols, where M may be 7). The sTTI physical channels using the first and second sTTI resource types may be transmitted and/or received in the same subframe. The sTTI physical channels using the first and second sTTI resource types may be intended for and/or received by different WTRUs (or by the same WTRU).

While FIG. 8. shows an example where sTTI resources are overlapped in time, and are not overlapped in frequency, it should be noted that there are many different possible configurations for allocating sTTI resources in a subframe.

For example, one or more sTTI resource types may be configured in a subframe and the one or more sTTI resource types may be non-overlapped in time, frequency, and spatial resources. In another example, one or more sTTI resource types may be configured in a subframe and the one or more sTTI resource types may be fully or partially overlapped in time, frequency, and/or spatial resources. It should be noted that the terms resource overlapping and resource sharing may be used interchangeably. Two or more sTTI resource types may be fully or partially overlapped in a first resource (e.g., time, frequency, or spatial) while non-overlapped in a second resource (e.g., time, frequency, or spatial), where the first resource and the second resource may be different. Two or more sTTI resource types may be fully or partially overlapped in time and/or frequency resources while a different spatial resource may be used for the two or more sTTI resource types. Two or more sTTI resource types may be fully or partially overlapped in time while a different frequency resource may be used for the two or more sTTI resource types. Two or more sTTI resource types may be fully or partially overlapped in frequency while a different time resource may be used for the two or more sTTI resource types. Two or more sTTI resource types may be allocated to any other combination of overlapping and non-over lapping, time, frequency, and spatial resources in a sub frame.

One or more of following parameters may apply for sets of PRBs. One or more PRB allocation types may be used to determine a set of PRBs allocated for a sTTI resource type. A first PRB allocation type may use localized PRBs (e.g., contiguous PRBs) to allocate a set of PRBs. A second PRB allocation type may use distributed PRBs (e.g., noncontiguous PRBs) to allocate a set of PRBs. The PRB allocation type (or PRB locations for a set of PRBs) may be defined (e.g., predefined) and/or determined based on the sTTI resource type. The PRB allocation type (or PRB locations for a set of PRBs) may be configured via higher layer signaling. The PRB allocation type may be configured for one or each of the sTTI resource type or configured in a cell-specific manner or WTRU-specific manner. The PRB allocation type (or PRB locations for a set of PRBs) may be indicated dynamically in one or each of the sTTI time windows.

One or more sTTI resources with the same sTTI resource type may be used, for example, in a sTTI, sTTI window, regular TTI, and/or subframe. For example, a first sTTI resource may be configured in a first frequency location and a second sTTI resource may be configured in a second frequency location. The first frequency location and the second frequency location may be non-overlapped in frequency domain. The first sTTI resource and the second sTTI resource may be the same sTTI resource type. For example, one or more of the following may be the same: a time resource amount, a frequency resource amount, and a spatial resource.

A sTTI resource type may refer to resources for multiple sTTI physical channels such as sPDCCH and sPDSCH, or sPDSCH and sPUCCH, where the resources of the multiple channels may not overlap or may not fully overlap, but may be related. For example a sTTI resource type may be used for sPDCCH and sPDSCH where the channels may use the same frequency resources, but the sPDSCH may be after the sPDCCH in time (e.g., by a configured, predetermined, or known relationship).

A WTRU may transmit, receive, monitor, attempt to receive, or attempt to decode, one or more sTTIs in a sTTI time window. A WTRU may transmit, receive, monitor, attempt to receive, or attempt to decode, one or more sTTI resources and/or resource types in a sTTI time window.

The following description may include a sTTI resource presence and/or sTTI resource type indication. In an embodiment, a WTRU may receive or attempt to decode an indication for a sTTI resource presence and/or one or more sTTI resource types for a sTTI time window. The WTRU may receive and attempt to decode the indication in a control channel region that may be located in the sTTI time window. The indicator may be referred to as a sTTI-indicator.

A sTTI-indicator may be or include an indicator for sTTI resource presence or an indicator for sTTI resource type. Indicator and indication may be used interchangeably. One or more sTTI-indicators may be used for one or more sTTI resources. For example, if multiple sTTI resources are configured or used in a sTTI time window, the presence of a sTTI resource may be indicated by an associated sTTI-indicator. The multiple sTTI resources may be of the same sTTI resource type or a different sTTI resource type. The sTTI-indicator may be an explicit indication or based on an event, signaling format, timing or the like.

One or more control regions (e.g., control channel regions) may be located in a sTTI time window and a WTRU may receive or attempt to decode at least one sTTI-indicator in at least one of the control regions. A control region may comprise a set of time and/or frequency resources. A control region may carry control information and/or one or more control channels. The terms control region and control channel region may be used interchangeably. A control region that may carry a sTTI-indicator may be a control region (e.g., the first control region) located at the beginning of a time period that may be a sTTI time window.

Figure 9:
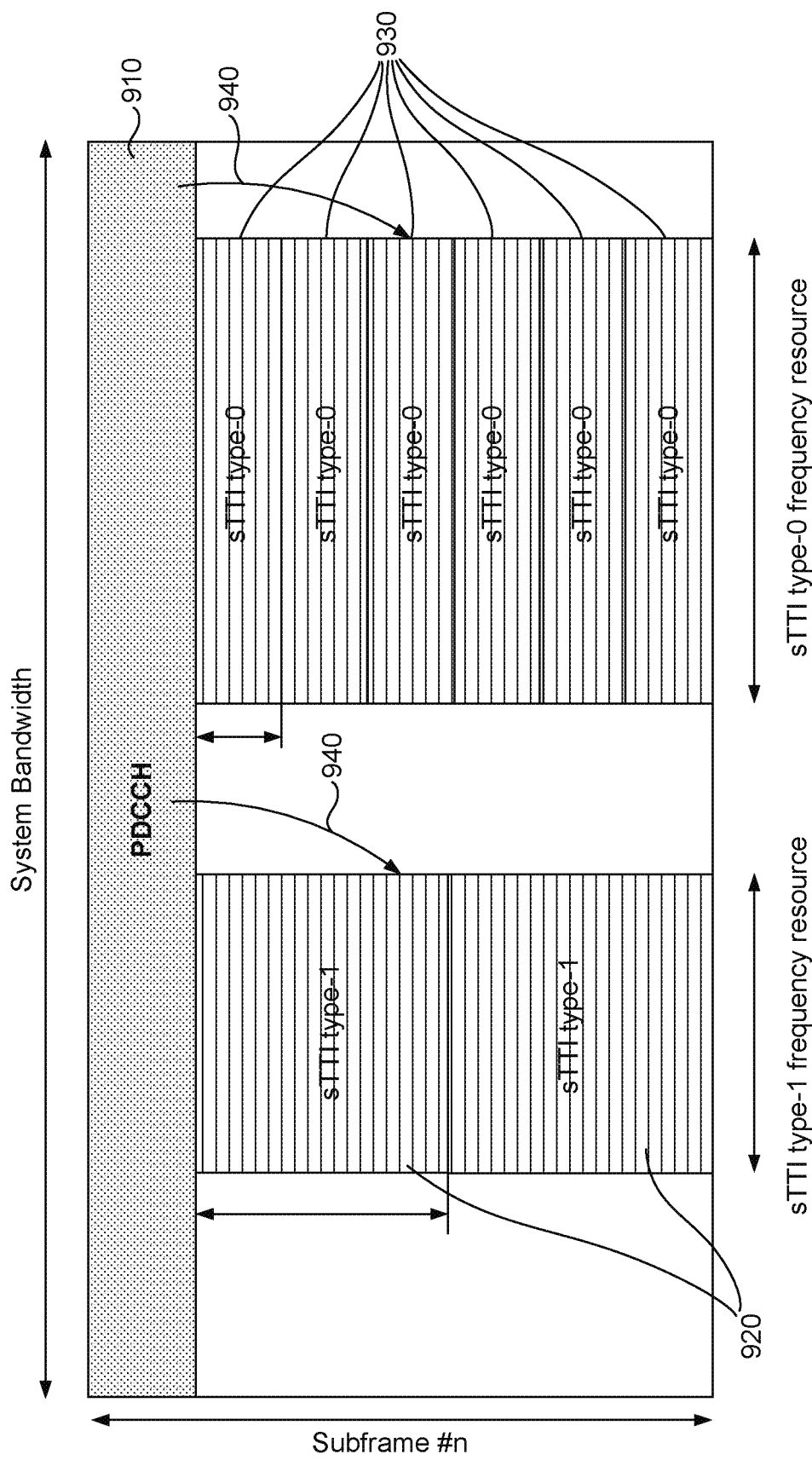
FIGS. 9 and 10 are diagrams of control region locations for a short Transmission Time Interval-indicator (sTTI-indicator)
Figure 10:
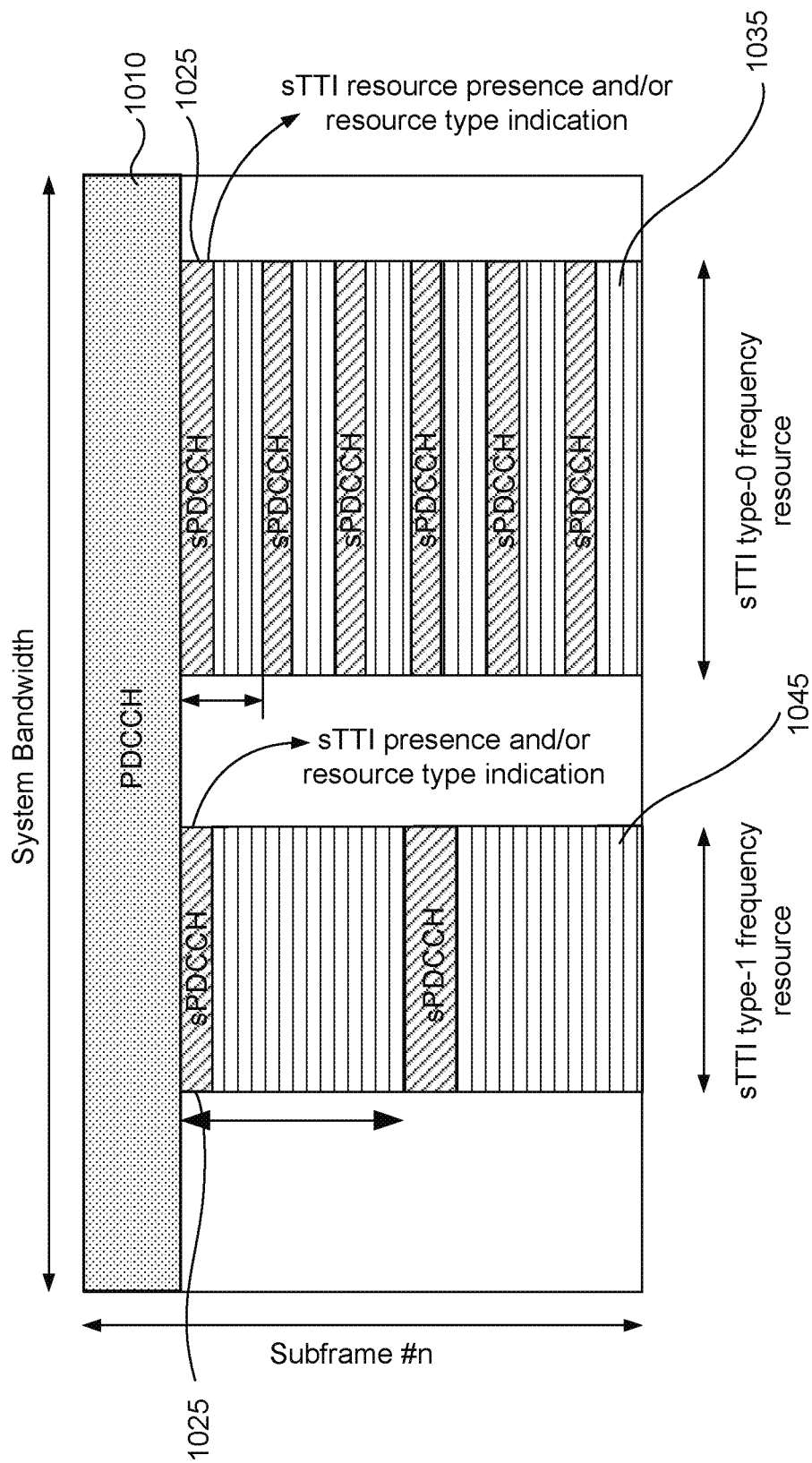

FIGS. 9 and 10 are diagrams showing control region locations for a sTTI-indicator. In FIG. 9, the PDCCH region 910 is located at the beginning of a regular TTI or subframe. The PDCCH region 910 may include an indication 940 of presence and/or resource type and location of sTTI resources in the subframe. In the example of FIG. 9, a first frequency region includes sTTI type 1 resources 920, and a second frequency region includes sTTI type-0 resources 930. The sTTI type 1 resources 920 and the sTTI type-0 resources 930 are over lapping in time. In this example, the PDCCH region 910 includes an indication 940 of presence and/or resource type and location of for each sTTI region 920 and 930.

In FIG. 10 shows a subframe that includes a PDCCH region 1010 at the beginning of the subframe. A control region may be the first sPDCCH region 1025 within or among multiple sPDCCH regions 1035, 1045 as shown in FIG. 10. The control region may be the first sPDCCH region within or among multiple sPDCCH regions (e.g., all the sPDCCH regions) within a time period that may be a sTTI time window (e.g., a regular TTI or subframe).

A control region that may carry a sTTI-indicator may be the PDCCH control region (e.g., legacy PDCCH control region) that may be located at the first N OFDM symbols of a subframe. The value of N may be a defined, determined, or configured value (e.g., N=2), for example, when the subframe contains one or more sTTI resources. The value of N may be dynamically indicated from the PCFICH. The PCFICH may be located in the control region (e.g., the first control region) that may carry a sTTI-indicator.

A control region that may carry a sTTI-indicator may be the first sPDCCH in a sTTI time window. For example, M sTTIs may be used, configured, or available in a sTTI time window. At least one of the M sTTIs may contain an associated sPDCCH. A WTRU may receive or attempt to receive at least one sTTI-indicator in the sPDCCH in the first sTTI of the M sTTIs.

A WTRU may monitor, attempt to monitor, receive, or attempt to receive a sTTI-indicator in at least one control region in a sTTI time window. The WTRU may use a sTTI-indicator to determine the presence of at least one sTTI resource in the sTTI time window or another time period. An example of the time period may be when the WTRU successfully receives or successfully determines the presence of the sTTI-indicator. Another other possible time period may be a later sTTI time window.

The WTRU may determine the presence of at least one sTTI resource in a sTTI time window, for example based on at least one of the presence, value, or contents of a sTTI-indicator that may be received in the sTTI time window or another time period. An example of another time period may be a previous (e.g., adjacent preceding) or earlier sTTI time window. If a sTTI resource is configured, in a sTTI time window, the WTRU may attempt to receive one or more sPDCCHs within the sTTI resource. If a sTTI resource is not configured, a WTRU may not attempt to receive at least some sTTI physical channels in the sTTI time window or other physical channels that may be in the sTTI time window. Other physical channels may refer to physical channels other than the one in which the WTRU monitored, attempted to receive, or received a sTTI-indicator. A control region that may carry a sTTI-indicator may be part of or included in a sTTI resource (or resource type) for which the sTTI-indicator may indicate presence (or lack of presence).

The presence of a sTTI resource or a sTTI resource type may be determined based on one or more of following parameters: system parameters, which may include one or more of system bandwidth, physical cell-ID, slot number, subframe number, and SFN number; WTRU-specific parameters which may include one or more of WTRU-ID (e.g., C-RNTI, IMSI, sTMSI, etc.); and configuration information for sTTI that may be signaled in a higher layer signaling (e.g., MIB, SIB, or WTRU-specific RRC signaling).

The following description may include sTTI resource configuration mechanisms. A sTTI resource may be configured and/or used. One or more sTTI resources may be configured via higher layer signaling. A sTTI resource may be configured with a time/frequency location. A sTTI resource may refer to a resource that may carry at least one sTTI physical channel (e.g., sPDCCH, sPDSCH, sPUCCH, sPUSCH).

One or more sTTI resources may be configured via a DCI. A DCI that may configure one or more sTTI resources may be monitored by a WTRU, for example, periodically or at configured or predetermined times. A DCI scrambled with a RNTI associated with at least one sTTI transmission may be used. The DCI may, for example, be referred to as sTTI-RNTI. For example, a DCI scrambled with sTTI-RNTI may be monitored in a subframe, a set of subframes, an SFN, and/or a set of SFNs (e.g., a certain set of SFNs or a set of SFNs that satisfy certain criteria).

The DCI may configure one or more sTTI resources. For example, a DCI scrambled with sTTI-RNTI may be transmitted (e.g., by a base station) and/or monitored by a WTRU in a first subframe of each radio frame. The set of subframes or SFNs in which to monitor for sTTI-RNTI may be configured. A DCI scrambled with sTTI-RNTI may be transmitted (e.g., by a base station) and/or monitored by a WTRU, for example in the set of subframes or SFNs that may be configured and/or used for sTTI-RNTI.

A sTTI resource may be configured by a base station. A WTRU may receive a sTTI resource configuration, for example from a base station. A WTRU may use (e.g., transmit in, receive in, or attempt to receive in) a sTTI resource that may be configured by a base station or other network entity.

A base station may transmit in a sTTI resource, for example, in the DL. A WTRU may receive or attempt to receive a transmission in a sTTI resource, for example in the DL. A WTRU may transmit in a sTTI resource, for example in the UL. A base station may receive or attempt to receive a transmission in a sTTI resource, for example in the UL.

An sTTI-indicator may be based on, transmitted on, or associated with PHICH resources. In an embodiment, one or more PHICH resources may be located in a control region such as a a PDCCH region or a sPDCCH region, and such region may carry or may be used to provide a sTTI-indicator. For example, one or more sTTI resources may be configured and the presence of a sTTI resource may be indicated in a sTTI time window by a sTTI-indicator. One or more PHICH resources (e.g., resources that may be configured for, reserved for, or used for PHICH) may be used to carry at least one sTTI-indicator. One or more PHICH resources may be configured for and/or used for a sTTI-indicator.

A PHICH resource may be represented by a PHICH group index $n_{PHICH}^{group}$ and a PHICH sequence index within the PHICH group $n_{PHICH}^{seq}$. Tables 7 and 8 show examples of a sTTI-indicator using one or more of PHICH resources. Table 7 shows an example of a sTTI-indicator using one or more PHICH resources for sTTI resource presence.

TABLE 7 sTTI-indicator using one or more PHICH resources for sTTI resource presence

| sTTI-indicator | | | |
|---|---|---|---|
| $n_{PHICH}^{group}$ | $n_{PHICH}^{seq}$ | HI | Configuration |
| 1 | 0 | 0 | A first sTTI resource is present |
| 1 | 0 | 1 | A first sTTI resource is not present |
| 2 | 0 | 0 | A second sTTI resource is present |
| 2 | 0 | 1 | A second sTTI resource is not present |

Table 8 shows an example of sTTI-indicator using one or more PHICH resources for sTTI resource presence and sTTI resource type indication.

TABLE 8

| sTTI-indicator | | | |
|---|---|---|---|
| $n_{PHICH}^{group}$ | $n_{PHICH}^{seq}$ | HI | Configuration |
| 1 | 0 | 0 | A (e.g., a first) sTTI resource is present and it is type-0 sTTI resource (e.g., 1 sTTI = 2 symbols) |
| 1 | 0 | 1 | A (e.g., a first) sTTI resource is present and it is type-1 sTTI resource (e.g., 1 sTTI = 4 symbols) |
| 1 | 4 | 0 | A (e.g., a first) sTTI resource is present and it is type-2 sTTI resource (e.g., 1 sTTI = 7 symbols) |
| 1 | 4 | 1 | A (e.g., a first) sTTI resource is not present |

It should be noted that Table 7 and Table 8 provide non-limiting examples of using PHICH resources to indicate sTTI resource presence and/or sTTI resource type.

The transmission and/or reception of the indicated HARQ Indicator (HI) codeword using the indicated PHICH sequence in the indicated PHICH location, according to the indicated PHICH group, may correspond to the indicated sTTI configuration (e.g., in the sTTI window of the PHICH transmission and/or reception).

When using a PHICH resource to carry a sTTI-indicator, one or more of the following parameters may apply. A sTTI-indicator for a first sTTI resource and a sTTI-indicator for a second sTTI resource may be in a different PHICH group and/or use a different PHICH sequence. A sTTI-indicator for a first sTTI resource type and a sTTI-indicator for a second sTTI resource type may be in a different PHICH group and/or use a different PHICH sequence. HI code words may be used to indicate the presence of a sTTI resource or sTTI resource type. Even-numbered or odd-numbered PHICH sequences may be used for sTTI-indicator. Two PHICH sequences with a maximum distance (e.g., index 0 and 4 for normal CP) or a minimum distance (e.g., consecutive two sequence numbers) may be used to indicate the presence of a sTTI resource.

Based on reception of a sTTI-indicator using PHICH resources, a WTRU may determine that a sTTI resource or resource type is present, for example, in a sTTI window such as the sTTI window in which the sTTI-indicator or PHICH resources are received. A WTRU may monitor, attempt to receive, and/or receive a sTTI resource when the WTRU determines that a sTTI resource is present. A WTRU may monitor, attempt to receive, and/or receive a sTTI resource according to a sTTI resource type when the WTRU determines that a sTTI resource of the sTTI resource type is present.

One or more PHICH resources that may be used for at least one sTTI-indicator may be determined based on at least one of the following parameters: system parameters that may include one or more of system bandwidth, PHICH configurations, physical cell-ID, subframe number, and/or SFN number; WTRU-specific parameters that may include one or more of WTRU-ID (e.g., C-RNTI, full or partial IMSI, sTMSI, etc.); and configuration information for sTTI that may be signaled in a higher layer signaling (e.g., MIB, SIB, or WTRU-specific RRC signaling). A PHICH resource that may carry a sTTI-indicator may be part of or included in a sTTI resource (or resource type) for which the sTTI-indicator may indicate presence (or lack of presence).

A signal may be used to convey a sTTI-indicator. The term sTTI-indicator signal may be used to represent a signal that may be used as a sTTI-indicator. A sTTI-indicator signal may be a predefined, configured, or known signal. A sTTI-indicator signal may be associated with one or more sTTI resources and/or sTTI resource types. Presence of a sTTI-indicator signal may indicate presence of the associated sTTI resources and/or sTTI resource types in a sTTI window, such as the sTTI window in which the sTTI-indicator signal is present.

A sTTI-indicator signal may be transmitted in a known location. For example, a predefined signal may be transmitted in a known location and the presence of the predefined signal (e.g., sTTI-indicator signal) may determine the presence of a sTTI resource.

The sTTI-indicator signal may be located in $N_{sTTI}$ symbols (e.g., the first $N_{sTTI}$ symbols) of a sTTI time window or a sTTI resource. $N_{sTTI}$ may be a positive integer number, including 1. $N_{sTTI}$ may be predefined or configured via higher layer signaling. $N_{sTTI}$ may be determined as a function of at least one of the following parameters: a time resource amount of the associated sTTI resource; a sTTI window length; a subframe number, a slot number, and/or SFN; and system parameters including frame structure (e.g., TDD, FDD), system bandwidth, and/or physical or virtual cell-ID. $N_{sTTI}$ may be indicated dynamically from an associated control channel (e.g., legacy PDCCH).

The sTTI-indicator signal may be a PCFICH. The sTTI-indicator signal may be transmitted in a sPDCCH region (e.g., the first sPDCCH region) within a sTTI time window. The sTTI-indicator signal may be a known sequence (e.g., Zadoff-Chu sequence, PN sequence, Golay sequence).

A WTRU may attempt to receive, receive, decode or attempt to decode a sTTI-indicator signal to determine the presence of one or more sTTI resources. The WTRU may monitor, receive, attempt to receive, decode and/or attempt to decode one or more sTTI resources (e.g., sTTI channels such as sPDCCH), for example when the WTRU determines that one or more sTTI resources are present. The WTRU may monitor, receive, attempt to receive, decode and/or attempt to decode one or more sTTI resources (e.g., sTTI channels such as sPDCCH) in the sTTI window of the sTTI indicator signal when the WTRU determines that one or more sTTI resources are present based on the reception and/or decoding (e.g., successful reception and/or decoding) of the sTTI-indicator signal.

A WTRU may skip reception of (e.g., not attempt to monitor, receive, and/or decode) a sTTI resource (e.g., sPDCCH and/or sPDSCH) if the WTRU determines that no (or no additional) sTTI resources are present. A WTRU may skip reception of a sTTI resource in a sTTI window if the WTRU determines that no (or no additional) sTTI resources are present in the sTTI window. A WTRU may determine that no (or no additional) sTTI resources are present (e.g., in a sTTI window) if the WTRU does not detect, receive, or decode a sTTI-indicator signal.

A WTRU may assume that no sPDCCH and/or sPDSCH is transmitted in a sTTI window in which the WTRU does not detect, receive, or decode a sTTI-indicator or sTTI-indicator signal in the sTTI window or time that corresponds to the sTTI window.

The reception of one or more sTTI resources when one or more sTTI resources are present may include at least one of the following: monitoring sPDCCH for a downlink DCI (e.g., DCI indicating a DL grant or other DL request or allocation) and/or a uplink DCI (e.g., DCI indicating an UL grant or other UL request or allocation) in the associated sTTI resources; and reception of one or more sPDSCH in the scheduled time, frequency, and/or spatial resources.

In another embodiment, a set of REGs in a control region (e.g., PDCCH region or sPDCCH region) that is within a sTTI time window may be reserved or used for the sTTI-indicator signal. The set of REGs may be distributed over a system bandwidth or part of a system bandwidth. The set of REGs may be associated with a CCE number (e.g., a certain CCE number that may be configured and/or known). The set of REGs may be determined based on at least one of the following parameters: system parameters (e.g., physical or virtual cell-ID, system bandwidth), sTTI resource type (e.g., time/frequency/spatial resources, sTTI length), and WTRU-specific parameters (e.g., WTRU-ID, C-RNTI).

A Down Link Control Information (DCI) message may be used to configure sTTI resources. In an embodiment, a DCI may be used to indicate the presence of one or more sTTI resources. For example, a DCI may be used to indicate the presence of one or more sTTI resources in a sTTI time window. A DCI in a sTTI time window may be used to indicate the presence of one or more sTTI resources in the same sTTI time window or another time period, such as another sTTI window.

One or more sTTI resources may be configured via higher layer signaling. The presence of one or more sTTI resources (e.g., one or more of the configured sTTI resources) in a sTTI time window may be indicated in a DCI (e.g., a DCI in the sTTI time window or another time period such as a previous sTTI time window). The DCI may be transmitted in a control region within a sTTI window. For example, the DCI may be transmitted in a legacy PDCCH region within a sTTI window. The DCI may be monitored in a common search space of a control region (e.g., legacy PDCCH region). Alternatively, the DCI may be monitored in a set (e.g., a predetermined set or configured set) of PDCCH resources (e.g., legacy PDCCH resources). For example, a set of predetermined or configured CCEs (e.g., CCE #16-32) may be used. The DCI may be scrambled with a sTTI specific RNTI (e.g., sTTI-RNTI). The DCI may indicate the presence of a sTTI resource and/or the associated sTTI resource type. The presence of a sTTI resource may be determined based on a sTTI specific RNTI used. For example, one or more sTTI specific RNTIs may be used to indicate the presence of one or more sTTI resources. Each sTTI resource may be associated with a specific sTTI-RNTI. A bitmap may be used in the DCI to indicate which sTTI resources are present in a sTTI time window.

A DCI may be used to configure a sTTI resource within a sTTI time window. For example, time, frequency, and/or spatial resources for a sTTI resource may be indicated in the DCI.

A downlink control channel, referred to as a sPDCCH, may be associated with one or more sTTIs. The terms sPDCCH, downlink control channel for sTTI, downlink control information for sTTI, sTTI DCI, and sDCI may be used interchangeably.

A sPDCCH may be located in a sTTI resource. A sTTI resource may be, or may include, at least one sPDCCH. A sPDCCH may be or may be referred to as a sTTI resource. A sPDCCH may be, or may be referred to as a part of a sTTI resource. The terms sPDCCH resource, sPDCCH region, sPDCCH symbols, sPDCCH subcarriers, and sPDCCH REs may be used interchangeably.

A sPDCCH resource may be associated with one or more sTTIs. For example, a sPDCCH may be associated with one or more sPDSCHs located in sTTIs that may be the same as or different from each other or the same as or different from the sTTI of the sPDCCH. A sPDCCH may include scheduling information for the associated one or more sPDSCHs.

A sTTI may include at least one sPDCCH. A sTTI may include at least one sPDSCH that may be associated with a sPDCCH that may be included in the sTTI. For example, in a sTTI, a subset of sTTI resources may be used for sPDCCH and the rest of the sTTI resources may be used for sPDSCH. A WTRU may monitor or attempt to decode sPDCCH in a sTTI or a sPDCCH region. A sPDCCH may indicate one or more scheduled sPDSCHs.

A WTRU may not monitor, or may skip monitoring, sPDCCH in resources (e.g., in a sTTI) where sPDSCH may be scheduled. The WTRU may determine where sPDSCH resources are scheduled (e.g., in a sTTI) based on reception of a sPDCCH including sPDSCH scheduling (e.g., for the sTTI). For example, two or more sTTIs, which may be of the same or different length, may overlap. Each sTTI may include a subset of resources for sPDCCH and a subset of resources for sPDSCH. For each sTTI, the resources for sPDCCH and sPDSCH may not overlap. The resources for sPDSCH of the first sTTI may overlap with the sPDCCH resources of the second sTTI. If sPDSCH resources are determined by the WTRU to be scheduled in the first sTTI, the WTRU may not monitor sPDCCH in the sPDCCH resources in the second sTTI. This may be due to an overlap with the sPDSCH resources scheduled in the first sTTI. The WTRU may monitor sPDCCH in the sPDCCH resources in the second sTTI when the sPDCCH resources in the second TTI are not overlapped with scheduled sPDSCH resources (e.g., in the first sTTI). The WTRU may determine that the sPDCCH resources in the second TTI are not overlapped with scheduled sPDSCH resources.

A sTTI window may include one or more sTTIs that may or may not overlap. The sTTIs in a sTTI window may be the same or different lengths. A control channel (e.g., PDCCH or sPDCCH) or control information (e.g., DCI or sDCI) may indicate potential scheduling that may be present in a sTTI window (e.g., regular TTI or subframe). The potential scheduling may be or may include at least one of the following parameters: the number of sTTIs, the number of sPDSCHs, the number of sPDCCHs, the number of sTTI control regions, and/or the number of sPDCCH regions. A WTRU may monitor sPDCCH in one or more sTTIs or one or more sPDCCH regions in a sTTI window. A WTRU may not monitor a sPDCCH in a sTTI window after receiving sPDSCH scheduling in or for the sTTI window. A WTRU may not monitor sPDCCH in a sTTI window in resources overlapped with a scheduled sPDSCH. This may occur, for example, when the WTRU receives scheduling for the sPDSCH and/or determines the sPDSCH is scheduled.

A sPDCCH (e.g., sDCI) may indicate a number of sPDSCHs that may be within a set, such as {n1, n2, n3, n4}. The set may be configured, defined, and/or determined. The number of sPDSCHs (e.g., n2) may determine the number of sTTIs (e.g., consecutive sTTIs) that may be used for sPDSCH scheduling in, for example, a sTTI window. A WTRU may monitor sPDCCH in a sTTI or a sPDCCH region, for example when a WTRU is not scheduled (e.g., in the sTTI window or in resources overlapping the sPDCCH resources).

A sPDCCH (e.g., sDCI) may indicate a set of sTTIs within a sTTI time window for the scheduling of sPDSCHs. For example, a bitmap may be used to indicate which sTTI or sTTIs within a sTTI time window may carry a sPDSCH. A sPDCCH region in a sTTI may be used for sPDSCH transmission, for example when the sPDSCH may be scheduled in a previous sTTI (e.g., by a sPDCCH in a sPDCCH region in a previous sTTI). A sPDCCH region which may be used for the scheduling of sPUSCH may be reserved and/or may not be used for sPDSCH transmission. It should be noted that, a PDCCH may be substituted for sPDCCH and a DCI may be substituted for sDCI.

Figure 11:
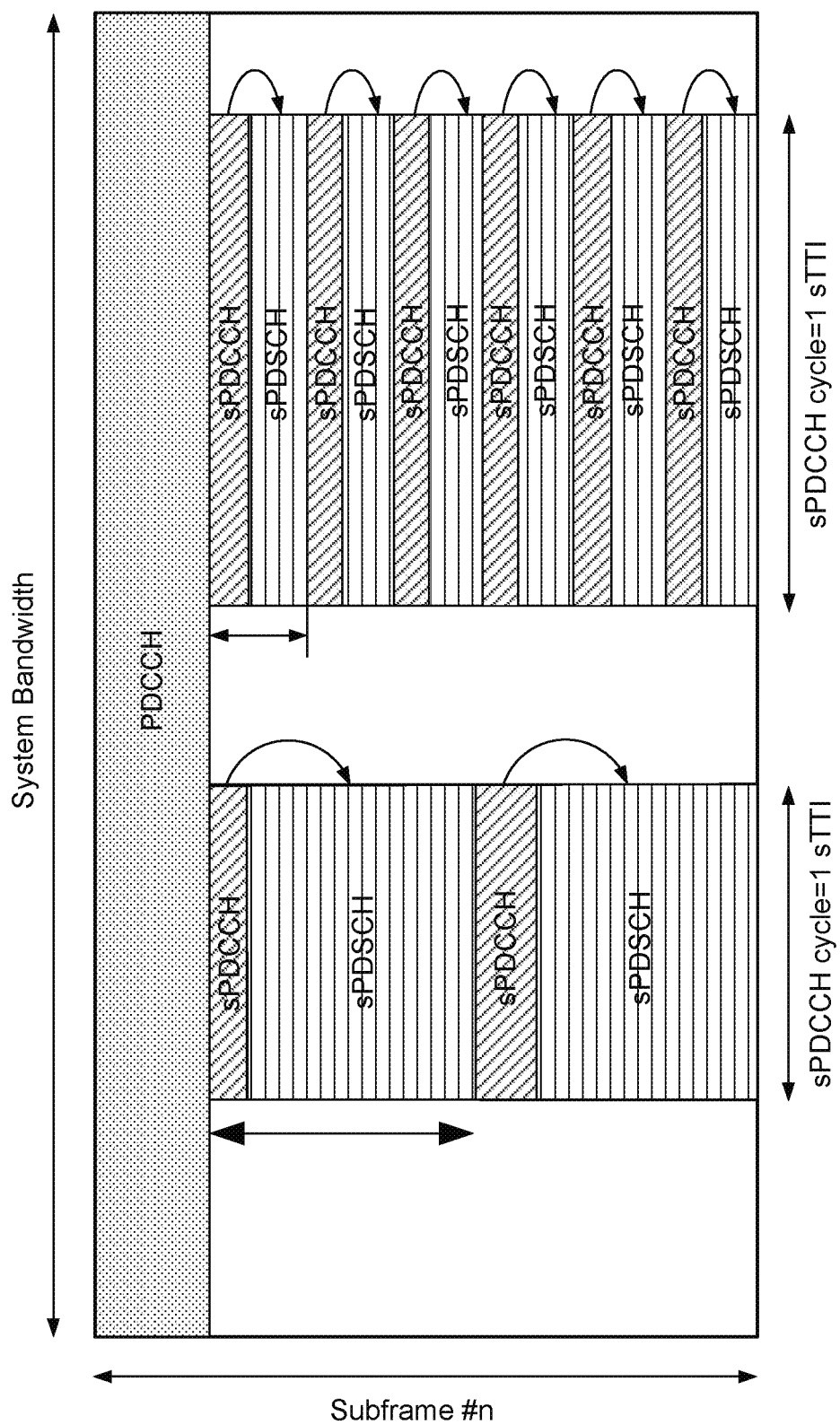
FIG. 11 is a diagram illustrating sTTI Physical Downlink Control Channel (sPDCCH) and sTTI Physical Downlink Shared Channel (sPDSCH) association per sTTI.

FIG. 11 is a diagram illustrating examples of sPDCCH and sPDSCH association per sTTI. The sPDCCH may be located in each sTTI and the associated sPDSCH may be scheduled from the sPDCCH located in the same sTTI.

Figure 12:
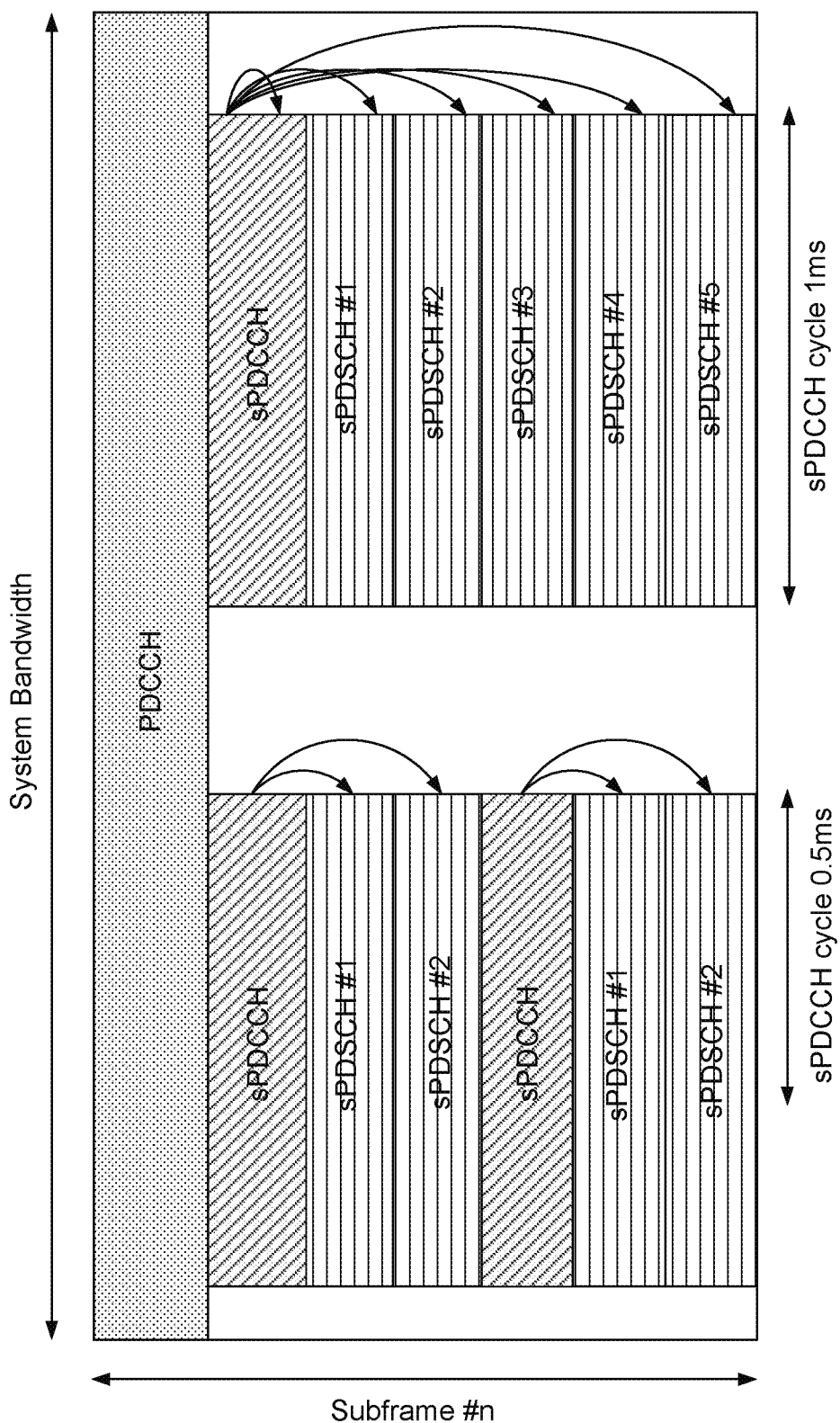
FIG. 12 is a diagram illustrating sPDCCH and sPDSCH association with multiple sTTIs.

FIG. 12 is a diagram illustrating sPDCCH and sPDSCH association with multiple sTTIs. A sPDCCH may be associated with one or more sPDSCHs, and the number of sPDSCHs associated with a sPDCCH may be determined based on a sPDCCH cycle.

Figure 13:
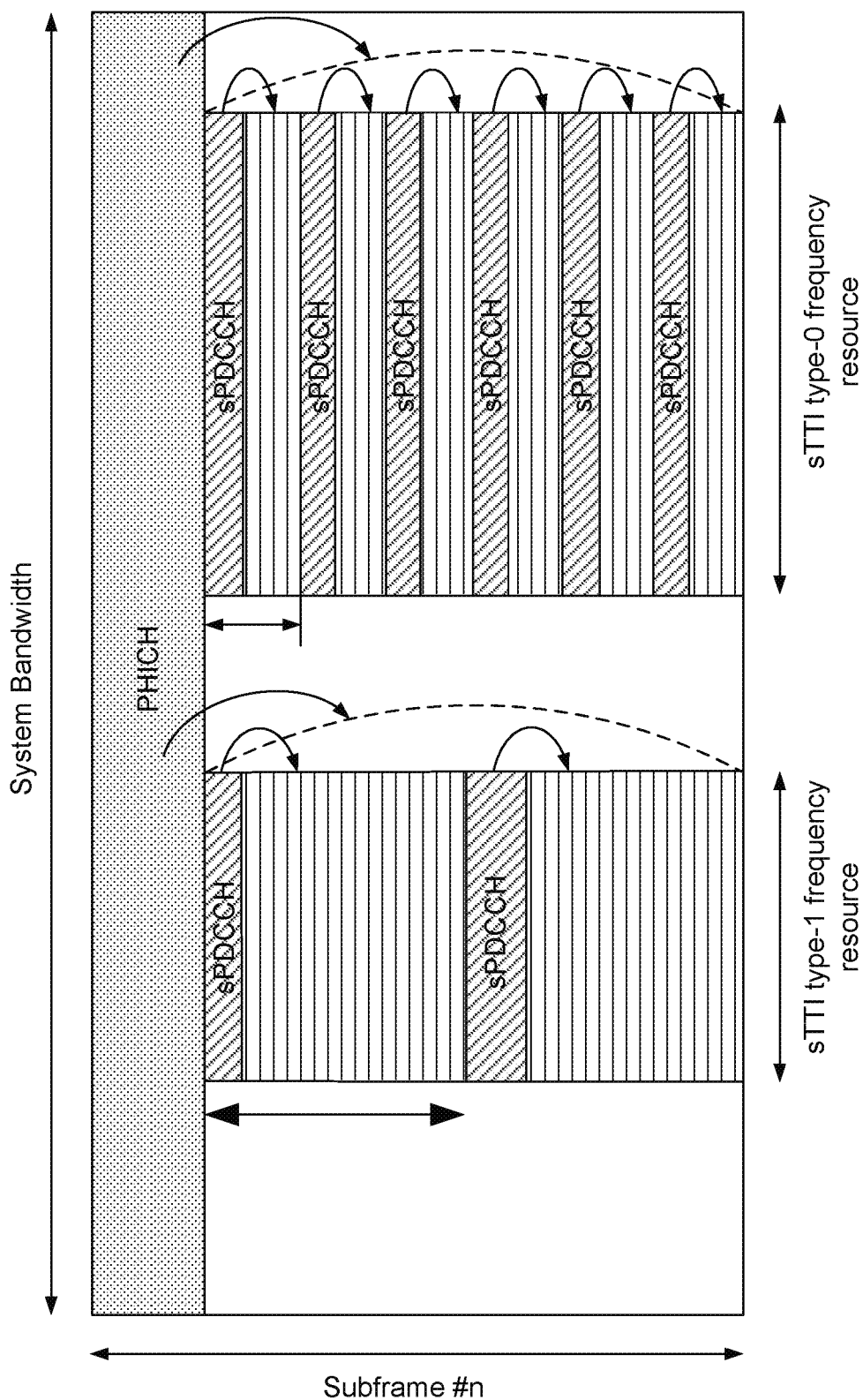
FIG. 13 is a diagram illustrating the use of PHICH resources as sTTI indicators.

FIG. 13 is a diagram illustrating the use of PHICH resources as sTTI indicators. One or more sTTI resources may be configured via higher layer signaling. A WTRU may receive one or more sTTI indicators associated with one or more sTTI resources in a subframe. The WTRU may monitor sPDCCH in one or more sTTI resources based on the configuration indicated from sTTI indicators. The WTRU may receive sPDSCH or transmit sPUSCH based on scheduling information from a DCI in sPDCCH.

A sPDCCH cycle may be the time between sPDCCH regions. A sPDCCH cycle may be the time period during which a sPDCCH region may be present. A sPDCCH cycle may indicate the number and/or location (e.g., time location) of the sPDCCH regions, for example in a sTTI window (e.g., normal TTI or subframe).

One or more of the following parameters may apply for sPDCCH configuration. A sPDCCH cycle may be determined based on system parameters, WTRU-specific parameters, and/or sTTI resource configuration information. A sPDCCH cycle may be determined as an integer multiple of sTTI length. A different sPDCCH cycle may be used for sTTI resources (e.g., different sTTI resources) that may be configured and/or used. A sDCI may be associated with one or more sPDSCHs.

A sDCI may be associated with a sPDSCH and one or more sDCI may be transmitted or monitored in a sPDCCH region. For example, a sDCI (or DCI) may include or identify an associated sTTI, sPDSCH, or sPDSCH region (e.g., an associated sTTI, sPDSCH, or sPDSCH region) implicitly or explicitly. For example, a sPDCCH or sPDCCH region may be associated with one or more sTTIs, sPDSCHs, and/or or sPDSCH regions, where a scheduling information for a sTTI, sPDSCH, and/or a sPDSCH region may be received via a sDCI in the associated sPDCCH or sPDCCH region.

A RNTI may be used to indicate a sTTI (e.g., a sTTI length or a sTTI time location). For example, the CRC of a DCI or sDCI may be scrambled with a RNTI that may correspond to an sTTI that may be used in a sTTI window. A RNTI associated with a specific sTTI may be used for a sDCI. The RNTI may indicate the sTTI length (or a sTTI time location) for the one or more sPDSCHs associated with the sDCI. A RNTI associated with a specific sTTI may be used to indicate the sTTI for sPDCCH monitoring or the sPDCCH cycle in, for example, a sTTI window.

For example, a set of RNTIs may be used. Each RNTI may be associated with a sTTI, sTTI length, sPDCCH cycle, and/or sPDSCH region. A WTRU may monitor one or more sPDCCHs or sPDCCH regions according to the sTTI length or sPDCCH cycle indicated by the RNTI. A WTRU may monitor one or more sPDCCHs or sPDCCH regions according to the sTTI length or sPDCCH cycle indicated by the RNTI. A WTRU may obtain the sTTI length of a sPDSCH region from the RNTI. The WTRU may use the sTTI length to receive and/or decode a scheduled sPDSCH.

A RNTI may be used to indicate or identify a sPDSCH or sPDSCH region (e.g., by CRC scrambling with the corresponding RNTI). A RNTI may be used to indicate the time and/or frequency location of one or more sPDCCH regions (e.g., by CRC scrambling with the corresponding RNTI). A WTRU may determine the location of a sPDCCH region and/or sPDSCH region from a RNTI. A WTRU may monitor, receive, attempt to receive, decode, and/or attempt to decode a sPDCCH in the determined location. A WTRU may receive and/or decode a scheduled sPDSCH from the determined location. The terms sPDSCH, sPDSCH region, and sPDSCH in a sTTI may be used interchangeably.

A location (e.g., starting control channel element (CCE) number and/or sPDCCH candidate number) of a sPDCCH candidate that may carry a sDCI may determine the associated sTTI location (e.g., the associated sPDSCH region). A WTRU may determine the location of the associated sPDSCH from the location of the sPDCCH. The WTRU may receive and/or decode a scheduled sPDSCH from the determined location. A bit field in a sDCI may be used to indicate the associated sPDSCH region.

In a sTTI, a signal (e.g., predefined or known signal) may be transmitted to indicate the presence of sPDCCH in at least the sTTI. The signal may be transmitted in a location (e.g., predefined or known location) within a sTTI. For example, a PCFICH may be transmitted in a symbol (e.g., the first symbol) of a sTTI to indicate presence of sPDCCH in at least the sTTI. When the signal is present or determined by a WTRU to be present, the WTRU may monitor sPDCCH in at least the sTTI. The signal may indicate at least one of the following: a presence of sPDCCH in the sTTI; a presence of sPDCCH in at least one sTTI or sPDCCH region in the sTTI window; the sTTI length; a sPDCCH cycle within the sTTI time window; and a sTTI length for sPDSCH. The signal may be transmitted in a previous sTTI or sTTI window. The signal may indicate sPDCCH presence and/or one or more of the parameters above for a subsequent or later sTTI or sTTI window.

The following description may include a sPDCCH resource indicator DCI. In an embodiment, a DCI in a certain sPDCCH search space in each sTTI resource may indicate the presence of a sPDCCH resource. In the indicated sPDCCH resource, a WTRU may need to monitor a DCI which may be associated with a sTTI resource allocation. The DCI to indicate the presence of a sPDCCH resource in a sTTI may be referred to as config-DCI, configuration DCI, or monitoring indicator.

For example, one or more potential sPDCCH resources may be configured, predefined, used, or determined in a subframe. Whether a WTRU may need to monitor one or more sPDCCH candidates for sPDSCH and/or sPUSCH in the potential sPDCCH resource may be determined based on the config-DCI. It should be noted that the term "potential sPDCCH resource" may be used interchangeably with the term "sTTI resource" and still be consistent with this disclosure.

The config-DCI may be monitored in one or more sPDCCH candidates. The one or more sPDCCH candidates which may carry config-DCI may be located in a known location in each potential sPDCCH resource.

A single sPDCCH candidate may be used. The time/frequency location and/or (E)CCE aggregation level of the sPDCCH candidate which may carry config-DCI may be predetermined. For example, a first sPDCCH candidate with a largest (E)CCE aggregation level in a set may be used for a config-DCI. The time/frequency location and/or (E)CCE aggregation level of the sPDCCH candidate that may carry config-DCI may be configured via higher layer signaling and/or may be dynamically indicated from a DCI from a control channel region such as a legacy control channel region (e.g., PDCCH).

A search space may be defined for config-DCI monitoring. The search space may be common for all WTRUs or for a group of WTRUs. The number of blind decoding attempts for config-DCI monitoring (e.g., the number of sPDCCH candidates for monitoring config-DCI) may be determined as Nbd. Nbd may be predefined, configured, or determined based on at least one of the following: a number of potential sPDCCH resources within an sTTI time window, a number of symbols used for an sPDCCH resource; a number of (E)CCEs; or a number of PRBs used for an sPDCCH resource. A common search space may be configured or predefined. A common search space may be determined based on at least one of the following: a sTTI length; a number of sTTI resources in a sTTI time window (e.g., subframe); or the number of potential sPDCCH resources in a sTTI time window.

A specific RNTI may be used for a config-DCI. For example, a config-DCI-RNTI may be used to scramble the CRC of the config-DCI.

A WTRU may receive, monitor, or attempt to decode one or more sPDCCH candidates which may carry a config-DCI in a potential sPDCCH resource. If a WTRU receives the config-DCI in a potential sPDCCH resource, the WTRU may start monitoring sPDCCH candidates for sPDSCH and/or sPUSCH. If a WTRU does not receive a config-DCI in a potential sPDCCH resource, the WTRU may skip monitoring sPDCCH candidates for sPDSCH and/or sPUSCH.

The presence of config-DCI in a potential sPDCCH resource may determine the presence of sPDCCH candidates for sPDSCH and/or sPUSCH scheduling. The config-DCI may include one or more of the following: the sPDCCH candidate set of the subset that may be monitored by a WTRU for sPDSCH and/or sPUSCH; the aggregation levels that may be monitored by a WTRU; or a sPDCCH resource for monitoring of one or more Das associated with sPDCCH and/or sPUSCH.

The number of sPDCCH candidates (Mbd) for sPDSCH and/or sPUSCH may be indicated from an associated config-DCI. For example, a WTRU may monitor Nbd sPDCCH candidates for a config-DCI in a potential sPDCCH resource and the WTRU may monitor Mbd sPDCCH candidates, wherein Mbd may be indicated from the config-DCI.

A WTRU may monitor Mbd sPDCCH candidates for sPDSCH and/or sPUSCH in a sPDCCH resource. A WTRU may determine Mbd (e.g, a value of Mbd). Mbd may be determined by, from, or based on the number of sPDCCH candidates (Nbd) for config-DCI. Mbd may be determined by, from, or based on the number of potential sPDCCH resources in which a config-DCI may be received. Mbd may be determined by, from, or based on the number of potential sPDCCH resources in a sTTI time window (e.g., subframe). Mbd may be determined by, from, or based on the number of sPDCCH resources indicated for monitoring within the potential sPDCCH resources. For example, a WTRU may be indicated to monitor a subset of Nsp potential sPDCCH resources and the Mbd may be determined based on the number of sPDCCH resources in the subset. Mbd may be determined by, from, or based on the number of PRBs configured, used, or determined for at least one potential sPDCCH resource. Mbd may be determined by, from, or based on the sTTI length associated with a potential sPDCCH resource.

Nsp potential sPDCCH resources may be configured, determined, used, or indicated and a WTRU may receive, monitor, or attempt to decode at least one of Nsp potential sPDCCH resources for config-DCI. Each potential sPDCCH resource may be configured or determined based on one or more parameters that may include at least one of the following: a starting symbol, a number of symbols, a number of PRBs, a number of (E)CCEs, or a reference signal type associated with or that may be used for demodulation. The starting symbol of sPDCCH resources may be determined as a function of the number of sPDCCH resources within a sTTI time window (e.g., subframe). The number of symbols for a sPDCCH resource may be predetermined, configured, or indicated, for example by a base station. The potential sPDCCH resources may be configured in a WTRU-specific manner. sTTI window and sTTI time window may be used interchangeably.

In another embodiment, one or more sPDCCH resources in a sTTI time window may be activated or deactivated for monitoring. Activation and/or deactivation may be configured, received, or indicated via a higher layer signaling (e.g., via RRC signaling, or via a MAC-CE). For example, one or more sPDCCH regions may be used and each sPDCCH region may include one more sPDCCH resources. One or more sPDCCH regions may be located in different frequency resources which may be non-overlapped in frequency within a sTTI time window.

A WTRU may receive an indication via higher layer signaling (e.g., MAC-CE) in a subframe n-k. The indication may or may indicate to activate (or deactivate) one or more sPDCCH regions associated with a subframe n. The WTRU may monitor (or skip monitoring) sPDCCH resources in one or more sPDCCH regions activated (or deactivated) from the indication or higher layer signaling in the subframe n. The variable k may be a predefined number or a configured number.

A WTRU may be associated with a (e.g., a single) sPDCCH region, where one or more sPDCCH resources (or potential sPDCCH resources) may be used. The one or more sPDCCH resources within a sPDCCH region may be located in different times (e.g., in different time locations). The Config-DCI may be monitored by WTRUs in each potential sPDCCH resource if the associated sPDCCH region is activated.

A sPDCCH (or sPDCCH region) may include one or more sPDCCH candidates. For example, a sPDCCH region in a sTTI may include $N_{sPDCCH}$ candidates, where $N_{sDCCH}$ may be determined based on at least one of the following parameters. A parameter may be a sPDCCH resource configuration that may include or identify time and/or frequency resources that may be used. A parameter may be a sTTI resource configuration that may include or identify time and/or frequency resources that may be used. A parameter may be one or more system parameters. A parameter may be a number of available resource elements (REs). The number of available REs may, for example, exclude REs that may be used for at least one of cell-specific reference signals, CSI-RS, DM-RS, and RS for sTTI.

A sPDCCH candidate may carry a sDCI that may be used for at least one the following: a scheduling of one or more sPDSCHs; scheduling of one or more sPUSCHs; a system information update indication; a sPDCCH order to initiate PRACH transmission; and an activation or deactivation of semi-persistent scheduling of sPUSCH or sPDSCH.

A sPDCCH candidate may be determined based on one or more short-TTI control channel elements (sCCE). One or more sPDCCH candidates may be used, transmitted, and/or monitored in a sPDCCH region. A sPDCCH candidate may be determined based on at least one of the following parameters: the number of sCCEs used, a starting sCCE, a starting sCCE and the number of sCCEs used, a sDCI type carried, and a sCCE type (e.g., localized or distributed).

A sCCE may be determined or defined as a set of REs within a sPDCCH region. For example, a sCCE may be defined or determined as consecutive $N_{sCCE,RE}$ REs in a PRB-pair in a downlink OFDM symbol. One or more of the following parameters may apply. The $N_{sCCE,RE}$ may be 12. The number of sCCEs in a sPDCCH region may be determined based on the number of PRBs and the number of OFDM symbols used for the sPDCCH region. The reference signal type, antenna port number, and/or the number of antenna ports used for a sCCE may be determined based on (or as a function of) at least one of the following: the sTTI resource type; system parameters, WTRU-specific parameters, the associated PRB number, and a transmission mode (e.g., CRS based transmission mode or DM-RS based transmission mode) used for the associated sPDSCH transmission. A sCCE may be determined, defined, and/or configured with one or more short-TTI resource element groups (sREG).

In another embodiment, a subset of nPDCCH resources may be used as a sPDCCH resource. For example, Ncce (E)CCEs may be located in an nPDCCH region and a subset of (E)CCEs may be used for sPDCCH transmission. The subset of (E)CCEs may be determined based on one or more of following parameters. A predefined set of (E)CCEs may be used. For example, the first Ns (E)CCEs (except for the (E)CCEs used for common search space) may be used as a set of (E)CCEs for sPDCCH transmission.

A first Ncom (E)CCEs may be used for the nPDCCH common search space and the (E)CCEs from Ncom+1 to Ncom+Ns may be used for sPDCCH transmission. In an example, Ncom may be 16. A WTRU may attempt to decode, monitor, or receive nPDCCH candidates, which may not include the one or more (E)CCEs used for sPDCCH. For example, if a nPDCCH candidate in a WTRU-specific search space includes one or more (E)CCEs for sPDCCH transmission, a WTRU may skip monitoring the nPDCCH candidate.

A subset of (E)CCEs may be configured via higher layer signaling. A starting (E)CCE number and/or the number of (E)CCEs may be configured, for example via higher layer signaling. The subset of (E)CCEs may be determined as a function of Ncce. The subset of (E)CCEs may be dynamically indicated from a DCI in a common search space. The subset of (E)CCEs may be replaced by (E)REG or (E)CCE/(E)REG.

An sPDCCH search space may be provided and/or used. The sPDCCH search space may include one or more sPDCCH candidates. The sPDCCH search space may be cell-specific, WTRU-specific, and/or physical channel specific. A sPDCCH search space may include one or more sPDCCH candidates that may be associated with one or more sPDCCH search space types (e.g., cell-specific, WTRU-specific, and/or physical channel specific).

A WTRU may attempt to decode, monitor, receive, or attempt to receive the sPDCCH candidates within a certain sPDCCH search space that may be associated with the WTRU. The sPDCCH candidates within a certain sPDCCH search space may be blindly decoded for a certain sDCI scrambled with a RNTI that may be associated with the WTRU. The number of blind decoding attempts within a certain sPDCCH search space may be the same as the number of sPDCCH candidates in the sPDCCH search space.

In an embodiment, a sPDCCH search space may be defined, configured, or determined per sTTI time window. For example, a sTTI time window may include one or more sPDCCH regions and a WTRU may monitor or attempt to decode one or more sPDCCH regions within a sTTI time window.

In an example, a total number of blind decoding attempts (e.g., a total number of sPDCCH candidates) within a sTTI time window may split into (or across or among) the number of sPDCCH regions. If the number of sPDCCH regions is increased, the number of blind decoding attempts (e.g., the number of sPDCCH candidates) in a sPDCCH region may be decreased. The number of sPDCCH candidates in a sPDCCH region may be determined based on the number of sPDCCH regions configured or determined in a sTTI time window. The terms sPDCCH region and sPDCCH search space may be used interchangeably.

In a sTTI time window, at least one cell-specific sPDCCH region and at least one WTRU-specific sPDCCH region may be used, configured, and/or determined. A cell-specific sPDCCH region and a WTRU-specific sPDCCH region may be located in non-overlapped time/frequency resources. A cell-specific sPDCCH region may be located in a first sPDCCH region within a sTTI time window. A WTRU-specific region may be located in one or more sPDCCH regions that may not be used as cell-specific sPDCCH regions.

A WTRU-specific sPDCCH region may be a subset of a cell-specific sPDCCH region. For example, a cell-specific sPDCCH region may be configured for each sTTI and WTRU-specific sPDCCH regions may be determined or configured in a subset of sTTIs within a sTTI time window.

A WTRU may determine a number of sPDCCH regions within a sTTI time window. The number of sPDCCH regions within a sTTI time window may be determined in a WTRU-specific manner. The number of sPDCCH candidates in a sPDCCH region may be determined based on the TTI length of the sPDCCH region and/or the sTTI length of an associated sPDSCH.

A WTRU may determine a number of sPDCCH candidates in a sPDCCH region. A WTRU may monitor one or more sPDCCH candidates, e.g., the determined number of sPDCCH candidates, in a sPDCCH region. The number of sPDCCH candidates in a sPDCCH region may be determined based on the number of sPDSCHs (or sTTIs) associated with the sPDCCH region. For example, a first number of sPDCCH candidates may be monitored in a sPDCCH region if one sTTI or one sPDSCH is associated with the sPDCCH region. A second number of sPDCCH candidates may be monitored in a sPDCCH region if multiple sTTIs or multiple sPDSCHs are associated with the sPDCCH region. The second number of sPDCCH candidates may be larger than the first number of sPDCCH candidates. If m1 sPDCCH candidates are monitored in a sPDCCH region when the sPDCCH region is associated with a sPDSCH region (or one sTTI), m2 sPDCCH candidates may be monitored in a sPDCCH region when the sPDCCH region is associated with multiple sPDSCH regions (e.g., sTTIs). The value m2 may be an integer multiple of m1 (e.g., m2=m1×K), where K may be the number of sPDSCH regions associated with the sPDCCH region.

In another embodiment, the sPDCCH search space may be defined, configured, or determined per sTTI. A predefined or configured number of sPDCCH candidates may be monitored in each sPDCCH region. One or more of following parameters may apply.

A WTRU may skip monitoring sPDCCH candidates in a sTTI (or a sPDCCH region) if one or more of following conditions are satisfied. A sPDSCH may be scheduled in the sTTI or in the sTTI window, for example by scheduling in a previous sPDCCH (e.g., a sPDCCH in a previous sTTI). The sTTI may not be associated with the WTRU (or WTRU-ID). The association may be predetermined, configured, or dynamically indicated. The sTTI may not be used for one or more physical channels such as sPDCCH and/or sPDSCH. In the sTTI, available resources for sTTI may be less than a threshold that may be defined (e.g., predefined) or configured. A WTRU may monitor sPDCCH in a subset of sTTIs that may be used for a sPDCCH search space.

In an example, a nPDCCH search space and one or more potential sPDCCH search spaces may be located in a sTTI time window (e.g., subframe). The number of nPDCCH candidates that may be monitored by a WTRU may be determined, for example by the WTRU, based on the number of sPDCCH search spaces configured or present in a sTTI time window.

For example, one or more potential sPDCCH search spaces may or may not be present in a sTTI time window. The presence of one or more sPDCCH search spaces may be indicated from an indicator described herein (e.g., sTTI resource indicator, config-DCI, etc.). The number of nPDCCH candidates may be determined, for example by a WTRU, based on the number of sPDCCH search spaces in a sTTI time window.

It should be noted that the term "sPDCCH search space" may be used interchangeably with the terms "sTTI resource," "sPDCCH resource," and "sTTI." If no sPDCCH search space is present in a sTTI time window, the number of nPDCCH candidates may be the same as the number of legacy PDCCH candidates. A smaller number of nPDCCH candidates may be monitored by a WTRU if a larger number of sPDCCH search spaces are located or used in a sTTI time window. If the number of sPDCCH search spaces is larger than a threshold that may be predefined or configured, a WTRU may not monitor nPDCCH candidates in a WTRU-specific search space.

In another embodiment, a nPDCCH search space and one or more potential sPDCCH search spaces may be located in a sTTI time window (e.g., subframe). The monitoring of the nPDCCH search space may be determined, foe example by a WTRU, based on nPDCCH type and the presence of one or more sPDCCH search spaces.

If at least one sPDCCH search space is present, the search space of a first nPDCCH type may not be monitored, for example by a WTRU, while the search space of a second nPDCCH type may be monitored, for example by the WTRU. For example, a first nPDCCH type may be EPDCCH and a second nPDCCH type may be PDCCH. If a sPDCCH search space is present, nPDCCH candidates of a first nPDCCH type may be switched to nPDCCH candidates of a second nPDCCH type.

A WTRU may be configured with a first nPDCCH type for a WTRU-specific search space. The WTRU-specific search space may be based on the first nPDCCH type (e.g., EPDCCH) if the WTRU does not need to monitor any sPDCCH search spaces in a subframe. The WTRU-specific search space may be based on a second nPDCCH type (e.g., PDCCH) if the WTRU needs to monitor one or more sPDCCH search spaces in a subframe.

The following description may include sPDCCH and nPDCCH joint operation. In an embodiment, joint sPDCCH and normal PDCCH (nPDCCH) search spaces may be used. A normal PDCCH (e.g., legacy PDCCH, nPDCCH) search space and sPDCCH search space may be configured (e.g., jointly configured) within a sTTI time window. For example, at least one normal PDCCH (nPDCCH) search space (or nPDCCH region) may be located in a sTTI time window. A DCI (e.g., a specific DCI), referred to herein as nTTI, may be transmitted in at least one nPDCCH search space.

The nPDCCH may include one or more nPDCCH candidates, which may carry one or more nDCI that may be used for nTTI operation. The nPDCCH may be at least one of PDCCH, enhanced PDCCH (EPDCCH), MTC PDCCH (M-PDCCH), and narrowband PDCCH (NB-PDCCH). A nDCI may include information related to sPDCCH search space configuration. A number of sPDCCH candidates may be indicated in nDCI. A subset of sPDCCH regions in a sTTI time window may be indicated in nDCI and a WTRU may monitor sPDCCH candidates within the subset of sPDCCH regions. A number of sCCEs in a sPDCCH region may be indicated in nDCI. A sTTI resource configuration including at least one of time resource configuration, frequency resource configuration, spatial resource configuration, and sTTI length may be indicated in a nDCI. A sDCI that may not be transmitted in an associated sPDCCH region, for example due to collision with other signals or limited resources, may be indicated in a nDCI.

In an embodiment, a nDCI may be used to configure a mode of operation. For example, two operation modes may be used (e.g., normal TTI mode and short-TTI mode) and the nDCI may configure, indicate, or (de)activate an associated operation mode. A WTRU may monitor a nDCI in a nPDCCH region. The WTRU may determine the operation mode based on the information in the nDCI. A WTRU may monitor PDCCH candidates in one or more PDCCH regions based on the determined operation mode. If a WTRU determines a first operation mode (e.g., normal TTI), the WTRU may monitor nPDCCH candidates in one or more nPDCCH regions. If a WTRU determines a second operation mode (e.g., short TTI), the WTRU may monitor sPDCCH candidates in one or more sPDCCH regions.

A nDCI may be transmitted in at least one, and as many as every, sTTI time window. The sTTI time window may be a time window for an operation mode. A nDCI may be transmitted in a subset of subframes and/or SFNs. A nDCI may be transmitted in a common search space in a nPDCCH region which may be monitored (e.g., commonly) by WTRUs configured for sTTI operation.

In another embodiment, a nDCI may be used as a fallback DCI between at least two operation modes. For example, a WTRU may monitor a nPDCCH region to receive a nDCI when the WTRU is configured with a certain operation or transmission mode (e.g., sTTI operation mode or sTTI transmission mode).

In an embodiment, a WTRU may be dynamically indicated to monitor, attempt to decode, or receive one or more sPDCCH search spaces in a sTTI time window (e.g., a subframe). The WTRU may determine a set (or subset) of nPDCCH candidates in the nPDCCH search space based on the indication.

In the case that a WTRU receives an indication of the presence of one or more sPDCCH search spaces in a sTTI time window, the WTRU may skip monitoring the nPDCCH search space in the sTTI time window. If the WTRU receives an indication of the absence of a sPDCCH search space in a sTTI time window, the WTRU may monitor the nPDCCH search space.

If the WTRU receives an indication of the presence of one or more sPDCCH search spaces, the WTRU may only monitor the nPDCCH common search space and may skip monitoring the nPDCCH UE-specific search space. The indication of the presence of one or more sPDCCH search spaces may be received in a DCI which may be monitored, received, or signaled in the nPDCCH common search space or may be received in one or more CCEs in a predetermined nPDCCH region.

In the case that a WTRU receives an indication of the presence of one or more sPDCCH search spaces in a sTTI time window, the WTRU may monitor, attempt to decode, or receive a subset of nPDCCH candidates in the associated nPDCCH search space in the sTTI time window. The WTRU may also monitor, attempt to decode, or receive a full set of nPDCCH candidates in the associated nPDCCH search space in the sTTI time window if the WTRU receives an indication of the absence of one or more sPDCCH search spaces in the sTTI time window.

The full set of nPDCCH candidates may be the same as the nPDCCH candidates the WTRU may need to monitor in a nPDCCH WTRU-specific search if the WTRU is not configured with sPDCCH monitoring or a sTTI operation mode. The subset of nPDCCH candidates may be determined based on at least one of following parameters: the presence of one or more sPDCCH search spaces; the number of sPDCCH search spaces in a sTTI time window, wherein a sPDCCH search space may be defined, determined, or configured as the sPDCCH search space associated with a sTTI; the number of sPDCCH candidates for a sPDCCH search space; and/or the number of total sPDCCH candidates for one or more sPDCCH search spaces presented or indicated.

The presence of one or more sPDCCH search spaces in a sTTI time window may be indicated in a nPDCCH region. The number of sPDCCH search spaces may be explicitly indicated in a DCI, which may be monitored in a nPDCCH region. The sTTI length associated with one or more sPDCCH search spaces may be indicated, wherein the number of sPDCCH search spaces may be determined as a function of the indicated sTTI length.

The subset of nPDCCH candidates may be determined based on the CCE aggregation levels. For example, a subset of CCE aggregation levels may be monitored if the presence of one or more sPDCCH search spaces is indicated.

In another embodiment, a set (or a subset) of nDCI types, which may be monitored in a nPDCCH search space, may be determined based on the presence of one or more sPDCCH search spaces in a sTTI time window and/or sDCI types. The one or more sPDCCH search spaces in a sTTI time window and/or sDCI types may be monitored in the sPDCCH search spaces.

A WTRU may be indicated, configured, or determined to monitor one or more sDCI types in one or more sPDCCH search spaces. For example, a first sDCI type may be associated with sPDSCH transmissions and a second sDCI type may be associated with sPUSCH transmissions. If the WTRU is indicated, configured, or determined to monitor the first sDCI type in one or more sPDCCH search spaces in an sTTI time window, the WTRU may monitor a set (or a subset) of nPDCCH candidates for a nDCI type associated with nPUSCH transmissions, and may skip monitoring nPDCCH candidates for a nDCI type associated with nPDSCH transmissions.

A WTRU may monitor either nDCI or sDCI for a similar transmission direction (downlink or uplink). A WTRU may be scheduled (or assume to be scheduled) with either sPDSCH or nPDSCH in a sTTI time window. A WTRU may be scheduled (or assume to be scheduled) with either sPUSCH or nPUSCH in a sTTI time window.

If a WTRU is indicated, configured, or determined to monitor a sDCI associated with sPUSCH transmissions in a sTTI time window (e.g., subframe n), the WTRU may skip monitoring a nDCI associated with nPUSCH transmissions in the same sTTI time window (e.g., subframe n). The sPUSCH and nPUSCH transmissions in the same sTTI time window may include full or partial overlapping of the sPUSCH and nPUSCH transmissions.

In another example, a WTRU may receive an indication of which subset of sPDCCH candidates to monitor. For example, one or more subsets of sPDCCH candidates may be configured, defined, predefined, determined, or predetermined and one of the subsets may be indicated in a DCI.

A DL reference signal for sPDSCH and sPDCCH channels may be needed. sPDSCH and/or sPDCCH transmission may be associated with one or more reference signal types (e.g., CRS, DM-RS), antenna ports, and/or precoding granularity. One or more reference signal types may be used. The reference signal type may be determined based on at least one of the following parameters. A parameter may be a scrambling sequence used. For example, a parameter used for a scrambling sequence initialization (e.g., physical cell-ID, WTRU-ID, virtual cell-ID) may be used. A parameter may be reference signal locations in time and frequency grid. A parameter may be precoding granularity of the reference signal. Within a precoding granularity, a WTRU may use the reference signal for channel estimation for the same antenna port. A parameter may be WTRU-specific or cell-specific configuration. A parameter may be reference signal power. A parameter may be reference signal overhead within a certain time/frequency resource. For example, RS type-0 may have zero reference signal overhead (e.g., no reference signal) for sPDSCH and/or sPDCCH transmission, RS type-1 may have 10% reference signal overhead, and RS type-2 may be 20% reference signal overhead.

The reference signal type may be determined based on a transmission mode configured for sPDSCH. The reference signal type may be indicated in a downlink control information associated with the sPDCCH or sPDSCH resource. The downlink control information for sPDSCH resource may be sDCI which may be carried in a sPDCCH region. The downlink control information for sPDCCH resource may be nDCI which may be carried in nPDCCH region.

In an embodiment, the reference signal type associated with sPDSCH and/or sPDCCH transmission may be determined based on at least one of following parameters. A parameter may be a transmission mode or scheme used. A parameter may be the time location of sTTI, or sTTI number within a sTTI time window. A parameter may be a modulation and coding scheme (MCS) used for the associated channel. A parameter may be a number of sTTIs bundled for sPDSCH transmission. For example, a RS type-1 may be used for a sPDSCH transmission if a single sPDSCH is scheduled in a sTTI time window while a RS type-2 may be used for a first sPDSCH and RS type-0 may be used for the rest of sPDSCH when multiple sPDSCHs are scheduled in a sTTI time window.

In another embodiment, the presence of a reference signal in a sTTI for sPDSCH and/or sPDCCH may be determined based on the location of sTTI or the sTTI number within a sTTI time window. For example, if $N_{sTTI}$ is located within a sTTI time window and each sTTI within the sTTI time window is numbered from 0 to $N_{sTTI-1}$, the reference signal may be present in (e.g., only in) a subset of sTTI numbers (e.g., even-numbered sTTIs or odd-numbered sTTIs).

A method for sPDCCH resource allocation is needed. In an embodiment, sCCEs may be defined, configured, and/or used in sTTI resources. The sCCEs may be used for sPDCCH and/or sPDSCH transmission. For example, a subset of sCCEs may be used for sPDCCH transmission and the rest of the sCCEs may be used for sPDSCH transmission.

A sTTI resource may be defined, configured, or determined based on a set of sCCEs. The number sCCEs in a sTTI resource may be determined based on the time/frequency resource used for the sTTI. A first subset of sCCEs in a sTTI resource may be defined or determined as sPDCCH region and a second subset of sCCEs in the sTTI resource may be defined or determined as sPDSCH region. A WTRU may receive a sDCI in a sPDCCH region and the WTRU may receive an associated sPDSCH in the sPDSCH region. The first subset of sCCEs and the second subset of sCCEs may be mutually exclusive. The first subset of sCCEs and the second subset of sCCEs may be fully or partially overlapped.

A sPDCCH region may be determined based on the sPDCCH candidate used for sDCI transmission. The number of sCCEs for a sPDCCH region may be determined based on the number of sCCEs used for a sPDCCH transmission and the rest of the sCCEs may be considered as a sPDSCH region. The number of sCCEs used for a sPDCCH transmission may be indicated from the associated sDCI for a sPDSCH transmission.

A sPDCCH region may be determined based on the number of sCCEs used for transmission of sDCIs. The sPDSCH region (or sPDSCH resource allocation) may be indicated dynamically from the associated sDCI. For example, a starting sCCE number and an end sCCE number may be indicated. A sTTI resource configured for sPDCCH may be used for sPDSCH transmission if one or more sCCEs are unused for sPDCCH transmission.

In another embodiment, one or more sPDCCH candidates may be used for sPDSCH transmission. For example, a sTTI resource may be defined as a sPDCCH search space and one or more sPDCCH candidates in a sPDCCH search space may be used for sPDSCH transmission. A sPDCCH candidate number may be indicated for sPDSCH transmission. Starting and end sPDCCH candidate numbers may be indicated from an associated sDCI for a sPDSCH transmission.

A system information (SI) update in an sTTI operation may be provided. A WTRU may monitor a nPDCCH common search space to receive a DCI with P-RNTI for SI update. The DCI with P-RNTI may include scheduling information of a PDSCH, which may include paging message. The paging message may include at least one of the following: the SI update, Earthquake Tsunami Warning System (ETWS), Commercial Mobile Alert Service (CMAS), or Extended Access Barring (EAB) parameters. Hereafter, the SI update, ETWS, CMAS, and/or EAB may all be referred to as a "direct indication." The direct indication may also include a valueTag and SI update per SI message.

A WTRU may attempt to receive the direct indication from a paging message when the WTRU monitors a nPDCCH search space in a subframe. A WTRU may attempt to receive the direct indication from a DCI in a sPDCCH search space if one or more sPDCCH search spaces are present. A sPDCCH candidate for the DCI which may carry the direct indication may be monitored in a known location (e.g., a sPDCCH common search space). One or more sPDCCH candidates may be monitored by a WTRU for the DCI which may carry the direct indication. The DCI which may carry the direct indication may be scrambled with a specific RNTI (e.g., direct-RNTI).

A WTRU may attempt to receive the direct indication from a DCI in an nPDCCH search space if one or more sPDCCH search spaces are present. A nPDCCH candidate for the DCI which may carry the direct indication may be monitored in a known location (e.g., a nPDCCH common search space). One or more nPDCCH candidates may be monitored by a WTRU for the DCI which may carry the direct indication. The DCI which may carry the direct indication may be scrambled with a specific RNTI (e.g., direct-RNTI).

In another embodiment, a WTRU may skip monitoring one or more sPDCCH candidates in a subframe if the UE may need to monitor a DCI with P-RNTI. For example, if a UE may need to monitor paging message in an nPDCCH common search space, the UE may skip monitoring one or more sPDCCH candidates in the subframe.

RE muting of sTTI resources may be performed. In an example, one or more REs in a sTTI resource (e.g., sPDCCH, sPDSCH) may be muted if the REs are used, configured, and/or occupied for one or more reference signals. The reference signals may include but are not limited to, at least one of: a periodic CSI-RS, an aperiodic CSI-RS, a demodulation RS (DM-RS), a cell-specific RS (CRS), and a positioning RS (PRS). One or more of the following parameters may apply.

The presence of a reference signal in a sTTI resource may be determined based on a higher layer configuration. Therefore, the presence of a reference signal (e.g., periodic CSI-RS, CRS, or PRS) may be known to the WTRU for a sTTI time window.

The presence of a reference signal and/or reference signal configurations in a sTTI resource may be dynamically indicated in a DCI. The DCI may be received, monitored, decoded, and/or transmitted in one or more following resources and according to one or more of the following parameters. The DCI may include configuration information of the reference signal presented. For example, one or more CSI-RS reuse patterns may be indicated in the DCI, wherein the REs to be used for the indicated one or more CSI-RS reuse patterns may be muted.

The DCI may be monitored in a nPDCCH region. The indication may be transmitted in a DCI that may be used to indicate the presence of one or more sTTI resources or one or more sPDCCH search spaces. The indication may be transmitted in a sDCI associated with one or more sPDSCH transmissions if a reference signal is presented within the associated one or more sPDSCH transmissions. The reference signal configurations may include at least one of the following: one or more CSI-RS reuse patterns; CSI-RS transmission power of the indicated one or more CSI-RS reuse patterns; a set of frequency resources in which a reference signal is presented; and a number of contiguous subframes in which the reference signal is presented.

The RE muting may be referred to as RE puncturing or RE rate-matching. The use of RE puncturing or RE rate-matching may be dynamically indicated for a certain reference signal. For example, RE rate-matching may be used for periodic CSI-RS, while RE muting (RE puncturing or RE rate-matching) may be indicated in a DCI for aperiodic CSI-RS. The DCI for RE muting type indication may be monitored in a common search space (e.g., nPDCCH common search space).

In some cases, the number of available REs within a sTTI resource (e.g., sPDCCH resource and/or sPDSCH resource) may be used to determine whether a WTRU monitors the sPDCCH search space. For example, the WTRU may calculate, determine, estimate, or count the number of available REs within a sTTI resource. If the number of available REs within the sTTI resource is lower than a threshold, the WTRU may skip monitoring the corresponding sPDCCH.

One or more of following may be considered as unavailable REs: a reference signal (e.g., periodic CSI-RS, aperiodic CSI-RS, IMR, CRS, DM-RS, PRS, and discovery RS), a physical broadcasting channel (PBCH), a synchronization signal (e.g., PSS or SSS), and the nPDCCH.

The threshold may be determined as a function of sTTI length. For example, a first threshold number (e.g., N1) may be used if a first sTTI length (e.g., 2 symbols) is used and a second threshold number (e.g., N2) may be used if a second sTTI length (e.g., 7 symbols) is used. One or more threshold numbers may be predefined, configured, or dynamically indicated. The associated threshold number may be dynamically indicated in a DCI used to indicate the presence of a sTTI resource in a sTTI time window. The DCI may be monitored in a nPDCCH region (e.g., a nPDCCH common search space or a known location within nPDCCH region).

The threshold numbers may be determined as a function of the number of frequency resource used for a sTTI resource. The periodic CSI-RS, which may be configured via higher layer signaling, may be considered to be unavailable REs, while the aperiodic CSI-RS, which may be indicated in a DCI, may be considered as to be available REs.

In another embodiment, the number of sTTI resources for a downlink transmission (e.g., sPDSCH and/or sPDCCH) may be determined based on the number of available REs in a sTTI resource. For example, if the number of available REs for a sTTI resource is lower than a threshold, the sTTI resource may be used together (or bundled) with one or more consecutive sTTI resources within a sTTI time window.

If the number of available REs for a sTTI resource within a sTTI time window (e.g., resource #n) is lower than a threshold, the number of available REs may be counted by combining a next sTTI resource (e.g., sTTI resource #n+1). If the number of available REs for combined (or bundled) sTTI resources is higher than a threshold, the WTRU may monitor a sPDCCH search space in the combined (or bundled) sTTI resources. The timing of HARQ-ACK and sPUSCH transmission may be based on the latest sTTI resource within the bundled sTTI resources. The effective sTTI length may be increased to K times if K sTTI resources are combined or bundled.

The number of sPDCCH candidates in each sPDCCH region for blind decoding may be determined based on the number of sTTI resources in a subframe. A smaller number of sPDCCH candidates may be monitored if the number of sTTI resources in a subframe gets larger. A common search space definition for legacy PDCCH and sPDCCH may be used for dynamic configuration between normal TTI and short TTI. A fallback DCI may be monitored in the common search space.

A set of sCCEs may be used in a sTTI resource, where sPDCCH and sPDSCH may be transmitted in mutually exclusive subsets of sCCEs. A first subset of sCCEs may be determined as sPDCCH carrying a DCI for sPDSCH scheduling in a sTTI resource. The remaining sCCEs may be used to transmit sPDSCH.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor; and
a transceiver;
the transceiver configured to receive configuration information indicating a location of a monitoring indicator and configuring a first set of normal physical downlink control channel (nPDCCH) candidates and a second set of nPDCCH candidates;

the transceiver configured to receive a first transmission including first downlink control information (DCI), the first DCI including the monitoring indicator at the indicated location;

the processor and the transceiver configured to monitor, based on the monitoring indicator, the first set of nPDCCH candidates within a time window and to skip monitoring of the second set of nPDCCH candidates within the time window; and the processor and the transceiver configured to decode a second transmission detected in the first set of nPDCCH candidates to receive second DCI.

2. The WTRU of claim 1, wherein the second DCI includes information indicating at least one of a downlink grant or an uplink grant.

3. The WTRU of claim 1, wherein the first set of nPDCCH candidates are associated with a legacy PDCCH search space, and wherein the second set of nPDCCH candidates are associated with an enhanced PDCCH (ePDCCH) search space.

4. The WTRU of claim 1, wherein the location of the monitoring indicator is indicated at least in terms of a time resource.

5. The WTRU of claim 1, wherein the first transmission including the first DCI is received in a control region of a PDCCH.

6. A method performed by a wireless transmit/receive unit (WTRU), the method comprising:

receiving configuration information indicating a location of a monitoring indicator and configuring a first set of normal physical downlink control channel (nPDCCH) candidates and a second set of nPDCCH candidates;

receiving a first transmission including first downlink control information (DCI), the first_DCI including the monitoring indicator at the indicated location; and monitoring, based on the monitoring indicator, the first set of nPDCCH candidates within a time window and skipping monitoring of the second set of nPDCCH candidates within the time window; and decoding a second transmission detected in the first set of nPDCCH candidates to receive second DCI.

7. The method of claim 6, wherein the second DCI includes information indicating at least one of a downlink grant or an uplink grant.

8. The method of claim 6, wherein the first one or more nPDCCH candidates are associated with a legacy PDCCH search space, and wherein the second set of nPDCCH candidates are associated with an enhanced PDCCH (ePDCCH) search space.

9. The method of claim 6, wherein the location of the monitoring indicator is indicated at least in terms of a time resource.

10. The method of claim 6, wherein the first transmission including the first DCI is received in a control region of a PDCCH.

* * * * *